(12) United States Patent
Juenemann et al.

(10) Patent No.: US 9,049,075 B2
(45) Date of Patent: Jun. 2, 2015

(54) ADAPTIVE MODAL PAM2/PAM4 IN-PHASE (I) QUADRATURE (Q) PHASE DETECTOR FOR A RECEIVER

(71) Applicant: Avago Technologies General IP (Singapore) Pte. Ltd., Singapore (SG)

(72) Inventors: Christopher M. Juenemann, Thornton, CO (US); Robert Keith Barnes, Fort Collins, CO (US); Jade Michael Kizer, Windsor, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 13/972,229

(22) Filed: Aug. 21, 2013

(65) Prior Publication Data
US 2015/0055694 A1    Feb. 26, 2015

(51) Int. Cl.
*H04L 27/00* (2006.01)
*H04L 27/06* (2006.01)
*H04L 25/03* (2006.01)

(52) U.S. Cl.
CPC ........ *H04L 27/066* (2013.01); *H04L 25/03057* (2013.01)

(58) Field of Classification Search
CPC ............... H04L 2027/0067; H04L 2027/0057; H04L 27/0014; H04L 2027/003; H04L 27/2657; H04L 27/2647; H04L 1/20; H04N 5/4401; H04B 1/30; H04B 1/28

USPC .......................................... 375/326, 324, 316
See application file for complete search history.

(56) References Cited

U.S. PATENT DOCUMENTS

| | | | |
|---|---|---|---|
| 7,339,989 B1 | 3/2008 | McAdam et al. | |
| 2003/0035495 A1* | 2/2003 | Laamanen et al. | 375/296 |
| 2005/0008086 A1* | 1/2005 | Koga et al. | 375/260 |
| 2005/0089126 A1* | 4/2005 | Zerbe et al. | 375/353 |
| 2006/0280272 A1* | 12/2006 | Stojanovic | 375/355 |
| 2012/0319794 A1 | 12/2012 | Watanabe et al. | |

OTHER PUBLICATIONS

Qureshi; Adaptive Equalization; Proceedings of the IEEE; vol. 73, No. 9, pp. 1349-1387; 1985.
Toifl et al.; A 22-Gb/s PAM-4 Receiver in 90-nm CMOS SOI Technology; IEEE Journal of Solid State Circuits, vol. 41, No. 4; pp. 954-965; 2006.
Schrader; Wireline Equalization using Pulse-Width Modulation; Thesis, Center for Telematics and Information Technology (CTIT); pp. 1-166; 2007.

* cited by examiner

*Primary Examiner* — Zewdu Kassa

(57) ABSTRACT

A phase detector includes data detection logic for detecting data in a communication signal, amplitude detection logic for processing modulation chosen from any of a PAM2 and a PAM4 communication modality, in-phase edge detection logic for detecting in-phase edge information in the communication signal, quadrature edge detection logic for detecting quadrature edge information in the communication signal, and mixing logic for determining an amount of in-phase edge information and quadrature edge information to be applied based on at least one channel parameter in the communication channel.

24 Claims, 22 Drawing Sheets

PAM 2/4 EDGE QUALIFICATIONS

Quadrature 3-0, 0-3 symmetric
Same as PAM2 0-1, 1-0

In-Phase 3-0, 0-3 Hamming
distance +3, -3

Quadrature 2-1, 1-2 symmetric

In-Phase 2-1, 1-2 Hamming
distance +1, -1, same as
PAM2 0-1, 1-0

Quadrature 3-1, 1-3, 0-2, 2-0
asymmetric

In-Phase 3-1, 1-3, 0-2, 2-0
Hamming distance +2,
-2, -2, +2

PAM 2/4 EDGE
QUALIFICATIONS

Quadrature 3-2, 2-3, 0-1, 1-0
symmetric, no edge

In-Phase 3-2, 2-3, 0-1, 1-0
Hamming distance -1,
+1, +1, -1

Quadrature 3-3, 0-0, no edge, same
as PAM2

In-Phase 3-3, 0-0 Hamming
distance 0, 0

Quadrature 2-2, 1-1 no edge

In-Phase 2-2, 1-1 Hamming
distance 0, 0 same as
PAM2 0-0, 1-1

PAM 2/4 QUADRATURE
EDGE UP/DN
CLASSIFICATIONS eq1 opposite MSB data, early so dn=1
eq0 same as MSB data, no edge eq1 same as MSB data, no edge
eq0 opposite MSB data, late so up=1

PAM 2/4 IN-PHASE EDGE
UP/DN CLASSIFICATIONS

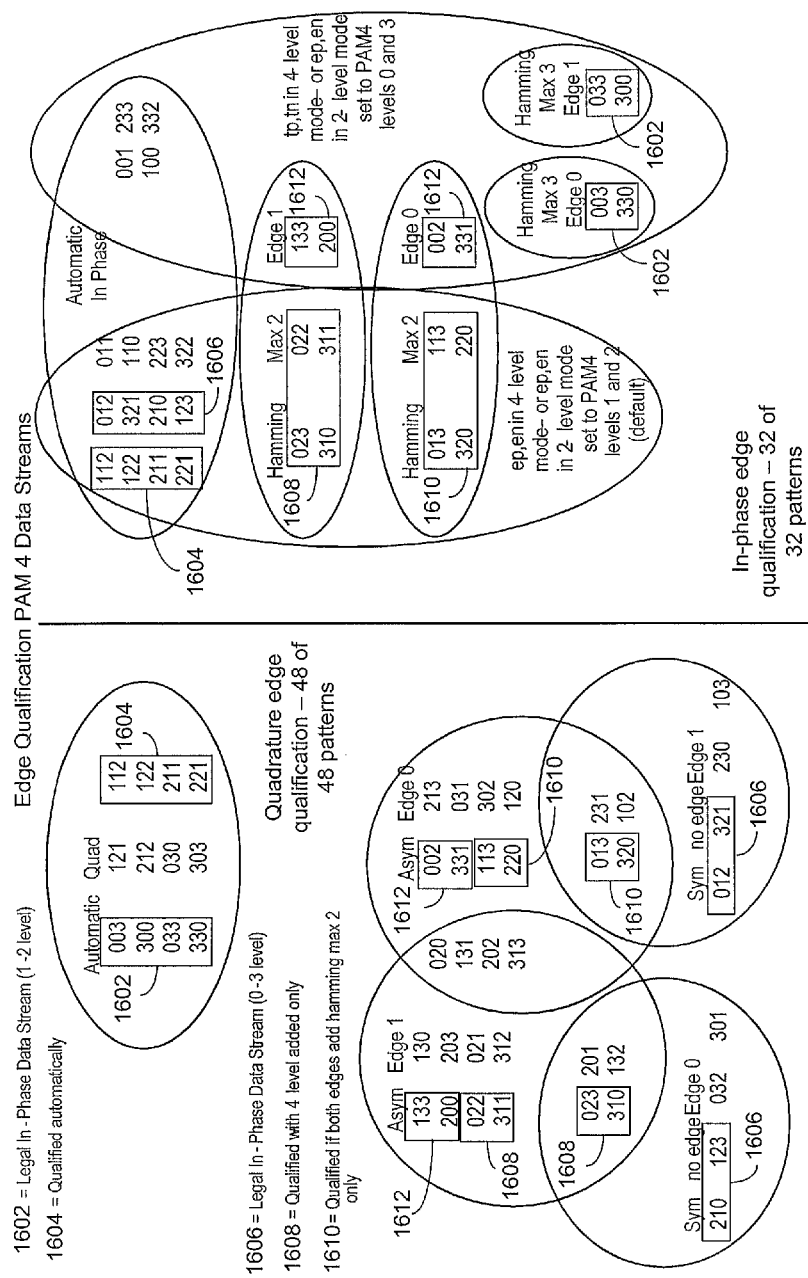

Quadrature Edge Up/Dn Truth Tables

PAM 2 Truth Table

| eq1 | eq0 | Data' | eq1 dn | eq0 up | final |
|-----|-----|-------|--------|--------|-------|
| 0 | 0 | 0 | 0 | 0 | 0 |
| 0 | 0 | 1 | 1 | 1 | 0 |
| 0 | 1 | 0 | 0 | 1 | up |
| 0 | 1 | 1 | 1 | 0 | dn |
| 1 | 0 | 0 | 1 | 0 | dn |
| 1 | 0 | 1 | 0 | 1 | up |
| 1 | 1 | 0 | 1 | 1 | 0 |
| 1 | 1 | 1 | 0 | 0 | 0 |

FIG. 17A

PAM 4 Truth Table

| eq1 | eq0 | Data' | eq1 dn | eq0 up | final |
|-----|-----|-------|--------|--------|-------|
| 0 | 0 | 0 | 0 | 0 | 0 |
| 0 | 0 | 1 | 1 | 1 | 0 |
| 0 | 0 | 2 | 1 | 1 | 0 |
| 0 | 0 | 3 | 0 | 0 | 0 |
| 0 | 1 | 0 | 0 | 1 | up |
| 0 | 1 | 1 | 1 | 0 | up |
| 0 | 1 | 2 | 1 | 0 | dn |
| 0 | 1 | 3 | 0 | 1 | dn |
| 1 | 1 | 0 | 1 | 0 | dn |
| 1 | 1 | 1 | 0 | 1 | dn |
| 1 | 1 | 2 | 0 | 1 | up |
| 1 | 1 | 3 | 1 | 0 | up |
| 1 | 0 | 0 | 1 | 1 | 0 |
| 1 | 0 | 2 | 1 | 1 | 0 |
| 1 | 0 | 3 | 0 | 0 | 0 |

FIG. 17B

In-Phase Edge Up/Dn Truth Tables

PAM 2 Truth Table

| ep | en | Data' | increas trajec | decreas trajec |
|----|----|-------|----------------|----------------|
| 0 | 0 | 0 | | |
| 0 | 0 | 1 | dn | up |
| 0 | 1 | 0 | up | dn |
| 0 | 1 | 1 | 0 | 0 |
| 1 | 0 | 0 | 0 | 0 |
| 1 | 0 | 1 | | |
| 1 | 1 | 0 | up | dn |
| 1 | 1 | 1 | | |

1802 = Illegal states produce up= dn =0,

1804 = PAM4 Data = 0 or 3, produces up= dn =0 when 4 - level disabled

FIG. 18A

PAM 4 Truth Table

| ep | en | Data' | increas trajec | decreas trajec |
|----|----|-------|----------------|----------------|
| 0 | 0 | 0 | dn | up |
| 0 | 0 | 1 | dn | up |
| 0 | 0 | 2 | 0 | 0 |
| 0 | 0 | 3 | 0 | 0 |
| 0 | 1 | 0 | up | dn |
| 0 | 1 | 1 | up | dn |
| 0 | 1 | 2 | dn | up |
| 0 | 1 | 3 | dn | up |
| 1 | 0 | 0 | 0 | 0 |
| 1 | 0 | 1 | 0 | 0 |
| 1 | 0 | 2 | 0 | 0 |
| 1 | 0 | 3 | 0 | 0 |
| 1 | 1 | 0 | 0 | 0 |
| 1 | 1 | 1 | | |
| 1 | 1 | 2 | up | dn |
| 1 | 1 | 3 | up | dn |

FIG. 18B

| Up[0] | Dn[0] | Up[1] | Dn[1] | up | dn |
|---|---|---|---|---|---|
| 0 | 0 | 0 | 0 | 0 | 0 |
| 0 | 0 | 0 | 1 | 0 | 1 |
| 0 | 0 | 1 | 0 | 1 | 0 |
| 0 | 1 | 0 | 1 | 0 | 1 |
| 0 | 1 | 1 | 1 | 0 | 1 |
| 0 | 1 | 0 | 0 | 1 | 0 |
| 1 | 0 | 0 | 1 | 0 | 0 |
| 1 | 0 | 1 | 0 | 0 | 0 |
| 1 | 0 | 1 | 0 | 1 | 0 |

FIG. 20

ADAPTIVE MODAL PAM2/PAM4 IN-PHASE (I) QUADRATURE (Q) PHASE DETECTOR FOR A RECEIVER

BACKGROUND

A modern integrated circuit (IC) must meet very stringent design and performance specifications. In many applications for communication devices, transmit and receive signals are exchanged over communication channels. These communication channels include impairments that affect the quality of the signal that traverses them. One type of IC that uses both a transmit element and a receive element is referred to as a serializer/deserializer (SERDES). The transmit element on a SERDES typically sends information to a receiver on a different SERDES over a communication channel. The communication channel is typically located on a different structure from where the SERDES is located. To correct for impairments introduced by the communication channel, a transmitter and/or a receiver on a SERDES or other IC may include circuitry that performs channel equalization and other methods of validating the received data. One of the functions performed at a receiver is the detection of a phase or phases of a received signal, particularly, the detection of phase information related to receive data and signal edge transition data.

Some of the challenges with phase detection become more challenging when attempting to design and fabricate a receiver that can operate using both PAM 2 and PAM 4 modalities. The acronym PAM refers to pulse amplitude modulation, which is a form of signal modulation where the message information is encoded into the amplitude of a series of signal pulses. PAM is an analog pulse modulation scheme in which the amplitude of a train of carrier pulses is varied according to the sample value of the message signal. A PAM 2 communication modality refers to a modulator that takes one bit at a time and maps the signal amplitude to one of two possible levels (two symbols), for example −1 volt and 1 volt. A PAM 4 communication modality refers to a modulator that takes two bits at a time and maps the signal amplitude to one of four possible levels (four symbols), for example −3 volts, −1 volt, 1 volt, and 3 volts. For a given baud rate, PAM 4 modulation can transmit up to twice the number of bits as PAM 2 modulation.

In addition, the impairments in the channel can cause further problems in detecting the phase. Channel loss is caused by the resistance and capacitance of the conductive material that forms the channel and the surrounding insulation material. Channel loss manifests in the communication system by reducing and broadening the symbol pulse sent from the transmitter before it is received at the receiver. The smaller and broader the pulse at the receiver, the higher the channel loss. If a channel has low channel loss then the only information about phase is found in the edge crossings caused by sending multiple symbols (quadrature detection). However, as channel loss increases, quadrature detection becomes less useful, and measuring the amplitude of the received signal becomes the best way to determine phase (in-phase detection). Since channel loss is based on the communication material outside of the SERDES IC, it is important to be able to switch the phase detection scheme. Possible phase detection schemes can be quadrature detection only, in-phase detection only, or a combination of quadrature and in-phase detection. These phase detection schemes also should work with different modulation schemes.

Therefore, it would be desirable to have a way to implement a phase detector in a receiver that is useful for both PAM 2 and PAM 4 modalities while allowing the receiver to change its phase detection scheme between quadrature and in-phase, to complement the channel loss.

SUMMARY

In an embodiment, a phase detector includes data detection logic for detecting data in a communication signal, amplitude detection logic for processing modulation chosen from any of a PAM2 and a PAM4 communication modality, in-phase edge detection logic for detecting in-phase edge information in the communication signal, quadrature edge detection logic for detecting quadrature edge information in the communication signal, and mixing logic for determining an amount of in-phase edge information and quadrature edge information to be applied based on at least one channel parameter in the communication channel.

Other embodiments are also provided. Other systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 14 shows the PAM 2 and PAM 4 quadrature edge qualification truth tables for data.

FIG. 15 shows the PAM 2 and PAM 4 in-phase edge qualification truth tables for data.

FIG. 16A shows the quadrature edge qualification for PAM 4.

FIG. 16B shows the in-phase edge qualification for PAM 4.

FIG. 17A shows the quadrature edge up/down truth table for PAM 2.

FIG. 17B shows the quadrature edge up/down truth table for PAM 4.

FIG. 18A shows the in-phase edge up/down truth table for PAM 2.

FIG. 18B shows the in-phase edge up/down truth table for PAM 4.

FIG. 20 shows a truth table for a 2-bit majority vote subcell used to create the majority vote element of FIG. 19.

DETAILED DESCRIPTION

An adaptive modal PAM2/PAM4 in-phase (I) quadrature (Q) (I/Q) phase detector for a receiver can be implemented in any integrated circuit (IC) that uses a digital direct conversion receiver (DCR) to receive a communication signal over a communication channel. In an embodiment, the adaptive modal PAM2/PAM4 I/Q phase detector for a receiver is implemented in a serializer/deserializer (SERDES) receiver operating at a 50 gigabit per second (Gbps) data rate by implementing a pulse amplitude modulation (PAM) 4 modulation methodology operating at 25 GBaud (Gsymbols per second). The 50 Gbps data rate is enabled, at least in part, by the pipelined implementation to be described below, and is backward compatible with PAM 2 modulation methodologies operating at a data rate of 25 Gbps.

As used herein, the term "cursor" refers to a subject bit, the term "pre-cursor" or "pre" refers to a bit that precedes the "cursor" bit and the term "post-cursor" or "post" refers to a bit that is subsequent to the "cursor" bit.

Figure 1:
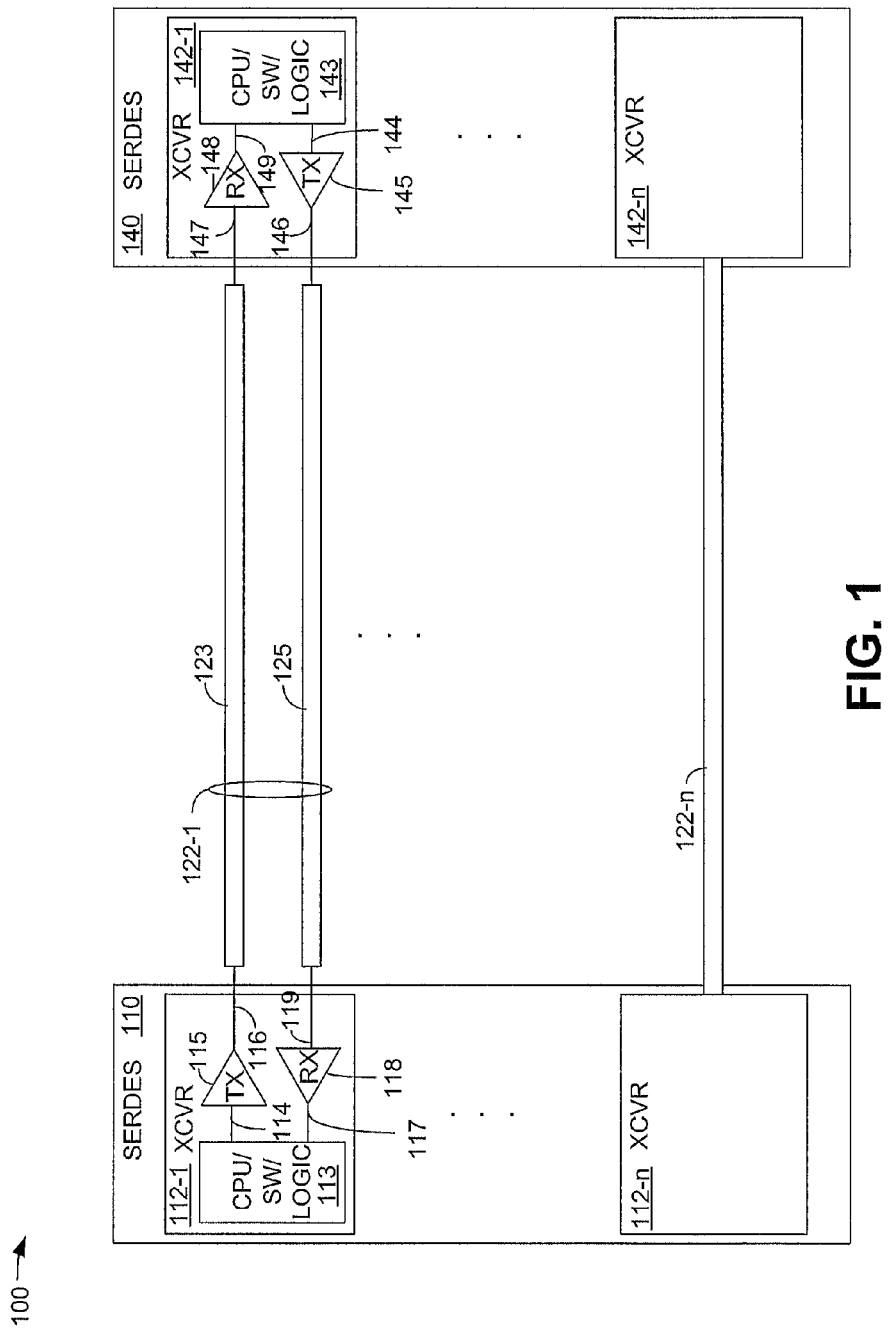
FIG. 1 is a schematic view illustrating an example of a communication system in which the adaptive modal PAM2/PAM4 in-phase (I) quadrature (Q) (I/Q) phase detector for a receiver can be implemented.

FIG. 1 is a schematic view illustrating an example of a communication system 100 in which the adaptive modal PAM2/PAM4 in-phase (I) quadrature (Q) (I/Q) phase detector for a receiver can be implemented. The communication system 100 is an example only of one possible implementation. The communication system 100 comprises a serializer/deserializer (SERDES) 110 that includes a plurality of transceivers 112. Only one transceiver 112-1 is illustrated in detail, but it is understood that many transceivers 112-n can be included in the SERDES 110.

The transceiver 112-1 comprises a logic element 113, which includes the functionality of a central processor unit (CPU), software (SW) and general logic, and will be referred to as "logic" for simplicity. It should be noted that the depiction of the transceiver 112-1 is highly simplified and intended to illustrate only the basic components of a SERDES transceiver.

The transceiver 112-1 also comprises a transmitter 115 and a receiver 118. The transmitter 115 receives an information signal from the logic 113 over connection 114 and provides a transmit signal over connection 116. The receiver 118 receives an information signal over connection 119 and provides a processed information signal over connection 117 to the logic 113.

The system 100 also comprises a SERDES 140 that includes a plurality of transceivers 142. Only one transceiver 142-1 is illustrated in detail, but it is understood that many transceivers 142-n can be included in the SERDES 140.

The transceiver 142-1 comprises a logic element 143, which includes the functionality of a central processor unit (CPU), software (SW) and general logic, and will be referred to as "logic" for simplicity. It should be noted that the depiction of the transceiver 142-1 is highly simplified and intended to illustrate only the basic components of a SERDES transceiver.

The transceiver 142-1 also comprises a transmitter 145 and a receiver 148. The transmitter 145 receives an information signal from the logic 143 over connection 144 and provides a transmit signal over connection 146. The receiver 148 receives an information signal over connection 147 and provides a processed information signal over connection 149 to the logic 143.

The transceiver 112-1 is connected to the transceiver 142-1 over a communication channel 122-1. A similar communication channel 122-n connects the "n" transceiver 112-n to a corresponding "n" transceiver 142-n.

In an embodiment, the communication channel 122-1 can comprise communication paths 123 and 125. The communication path 123 can connect the transmitter 115 to the receiver 148, and the communication path 125 can connect the transmitter 145 to the receiver 118. The communication channel 122-1 can be adapted to a variety of communication methodologies including, but not limited to, single-ended, differential, or others, and can also be adapted to carry a variety of modulation methodologies including, for example, PAM 2, PAM 4 and others. In an embodiment, the receivers and transmitters operate on differential signals. Differential signals are those that are represented by two complementary signals on different conductors, with the term "differential" representing the difference between the two complementary signals. The two complementary signals can be referred to as the "true" or "t" signal and the "complement" or "c" signal. All differential signals also have what is referred to as a "common mode," which represents the average of the two differential signals. High-speed differential signaling offers many advantages, such as low noise and low power while providing a robust and high-speed data transmission.

Figure 2:
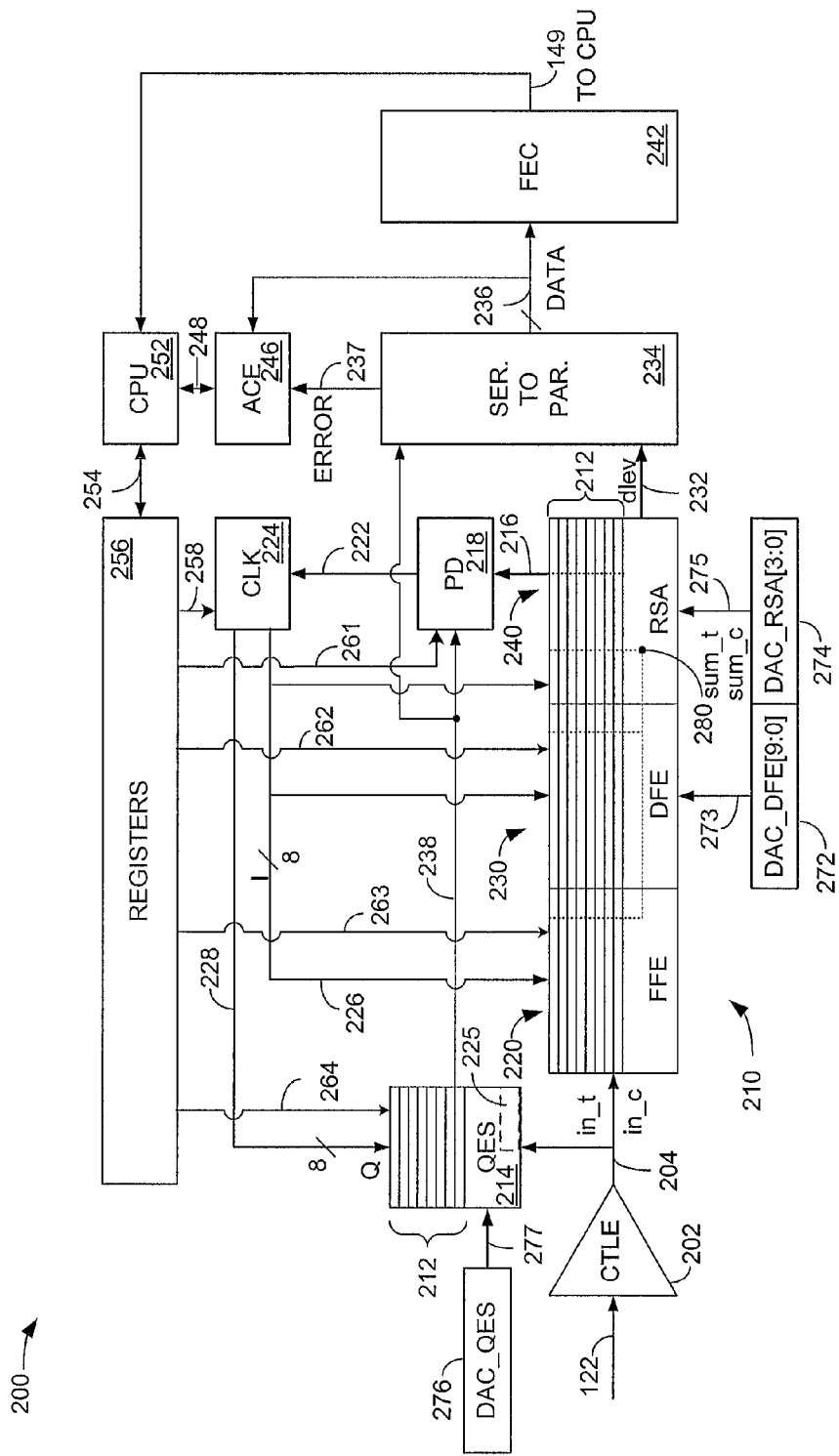
FIG. 2 is a schematic diagram illustrating an example receiver of FIG. 1.

FIG. 2 is a schematic diagram illustrating an example receiver of FIG. 1. The receiver 200 can be any of the receivers illustrated in FIG. 1. The receiver 200 comprises a continuous time linear equalizer (CTLE) 202 that receives the information signal from the communication channel 122 (FIG. 1). The output of the CTLE 202 is provided to a quadrature edge selection (QES) element 214 and to a pipelined processing system 210. The pipelined processing system 210 comprises a pipelined feed forward equalizer (FFE) 220, a pipelined decision feedback equalizer (DFE) 230 and a regenerative sense amplifier (RSA) 240.

The reference to a "pipelined" processing methodology refers to the ability of the FFE 220, the DFE 230 and the RSA 240 to process 8 pipelined stages 212 (referred to below as sections D0 through D7) simultaneously, along with QES 214, also pipelined.

The DFE 230 receives a threshold voltage input from a digital-to-analog converter (DAC) 272 over connection 273. The RSA 240 receives a threshold voltage input from a digital-to-analog converter (DAC) 274 over connection 275. The DAC 272 and the DAC 274 can be any type of DAC that can supply a threshold voltage input based on system requirements. In an embodiment, a single DAC 272 can be shared across the pipelined stages of the DFE 230, thus reducing cost and maximizing processing efficiency.

In each pipelined stage 212, the FFE 220 and the DFE 230 generate analog outputs, which are summed together at summing node 280, referred to as "sum_t" and "sum_c." The summing node 280 is also the input to RSA 240, which acts as an analog-to-digital converter. The RSA 240 converts an analog voltage into a complementary digital value.

The RSA 240 takes the analog signals sum_t and sum_c on the summing node 280, and generates digital representations, referred to as "dlev" on connection 232. In a PAM 4 embodiment, the dlev signal comprises a 2 bit word and in a PAM 2 implementation, the dlev signal comprises a 1 bit word. This signal is also referred to as a "main data" signal. The RSA 240 also generates in-phase edge information. The output of the RSA comprises data (dlev) and in-phase edge information (ep, en, tp and tn) and is provided from each of the 8 pipelined stages 212 over connection 216 to a phase detector (PD) 218 and over connection 232 to the serial-to-parallel converter 234. The output of the phase detector 218 comprises an update signal having, for example, an up/down command, and is provided over connection 222 to a clock (CLK) element 224. The clock element 224 provides an in-phase (I) clocking signal over connection 226 and provides a quadrature (Q) clocking signal over connection 228. The in-phase (I) clocking signal is provided to the pipelined FFE 220, the DFE 230, and to the RSA 240, and the quadrature (Q) clocking signal is provided to the QES element 214.

The QES element 214 receives a threshold voltage input from a DAC 276 over connection 277. The DAC 276 can be any type of DAC that can supply a threshold voltage input based on system requirements. The QES element 214 also comprises an RSA 225 to perform quadrature edge detection.

The output of the RSA 240 on connection 232 is a digital representation of the raw, high speed signal prior to extracting any line coding, forward error correction, or demodulation to recover data. In the case of PAM 2, the output is a sequence of ones and zeros. In the case of PAM N, it is a sequence of N binary encoded symbols. For example, for PAM 4, the output comprises a string of distinct symbols each identified by a different two bit digital word, with four possible symbols. The output of the RSA 240 is also provided over connection 232 to a serial-to-parallel converter 234. The serial-to-parallel converter 234 converts the high speed digital data stream on connection 232 to a lower speed bus of parallel data on connection 236. The output of the serial-to-parallel converter 234 on connection 236 is the parallel data signal and is provided to a forward error correction (FEC) element 242. The output of the serial-to-parallel converter 234 on connection 237 is an error, or test, signal and is provided to an automatic correlation engine (ACE) 246. The error, or test, signal is used to drive system parameters to increase signal-to-noise ratio in the receiver 200, and can be generated in several ways. One way is to use samplers inside the QES element 214 to identify zero crossings (also called edge data, or the transition between data bits). Another method is to use auxiliary samplers inside the RSA element 240 to identify the high amplitude signals (equivalent to the open part of an eye diagram). So, for example, using the edge data method, if a sampler inside the QES element 214 began to detect a positive signal where the zero crossing point should occur, then the ERROR signal on connection 237 would increase, and various system parameters could be driven to reduce that error. The output of the FEC 242 is provided over connection 149 to the CPU 252.

The output of the ACE 246 is provided over connection 248 to the CPU 252. The implementation of the ACE 246 could be done with hardware on chip, firmware off chip, or a combination of hardware and firmware, and a CPU, in which case the CPU 252 would read and write to the ACE 246 over connection 248. The ACE 246 compares the received data to a pseudorandom binary sequence (PRBS) pattern and provides a correlation function to support implementation of a least minimum square (LMS) algorithm for tuning the receiver 200.

The CPU 252 is connected over a bi-directional link 254 to registers 256. The registers 256 store DFE filter coefficients, FFE controls, CTLE controls, RSA threshold voltage controls, offset correction values for the RSA and QES elements, and controls for the DACs.

An output of the registers 256 on connection 261 is provided to the phase detector 218, an output of the registers 256 on connection 262 is provided to the pipelined DFE 230, an output of the registers 256 on connection 263 is provided to the pipelined FFE 220, and an output of the registers 256 on connection 264 is provided to the QES element 214. Although not shown for simplicity of illustration, the registers 256 also provide control outputs to the CTLE 202 and to all the DACs. In an embodiment, the output of the QES element 214 on connection 238 comprises data and quadrature edge information and is provided to the phase detector 218 and the serial-to-parallel converter 234.

The elements in FIG. 2 generally operate based on a system clock signal that runs at a particular frequency, which corresponds to the baud rate of the data channel. A time period, referred to as a unit interval (UI) generally corresponds to a time period of one clock cycle of the system clock. For example, a transceiver could be communicating at 50 Gbps, using PAM4, the baud rate is 25 G baud per second, and one UI would be 40 ps=1/25 G.

Generally, a receive signal on connection 204 is applied to an array of FFE/DFE/RSA/QES sections. If an array of N sections is implemented, then each section can process the receive signal at a rate of 1/(UI*N) which significantly relaxes power requirements compared to the standard (unpipelined) processing.

For example, a 25 Gbaud receive signal could be processed by an array of 8 sections, each section running at 3.125 GHz. The start time for each section is offset by 1 UI from its neighboring section, so that when the outputs from all 8 sections are summed together (signal 232), it is updated at the original 25 Gbaud rate.

Figure 3A:
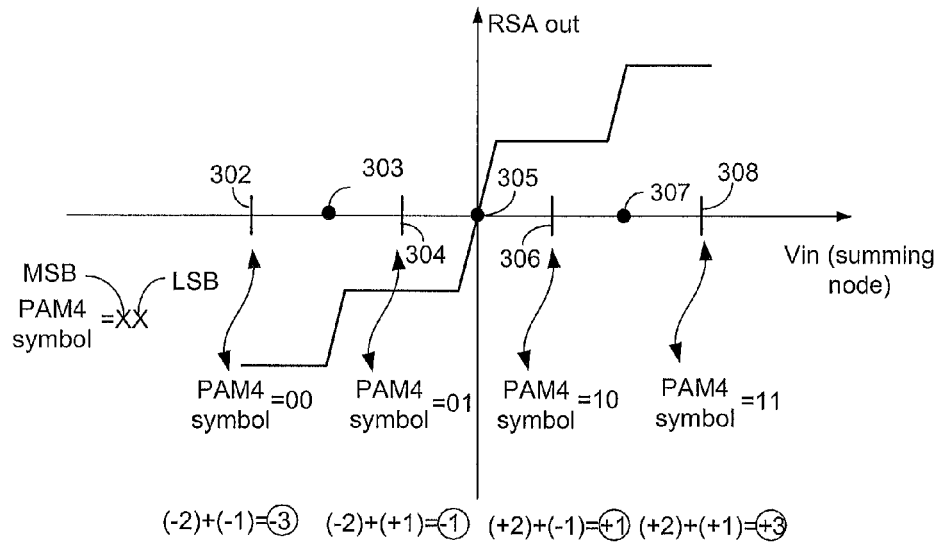
FIGS. 3A and 3B are schematic diagrams illustrating RSA sampler locations for a PAM 4 embodiment of the adaptive modal PAM2/PAM4 IQ phase detector of FIG. 2.
Figure 3B:
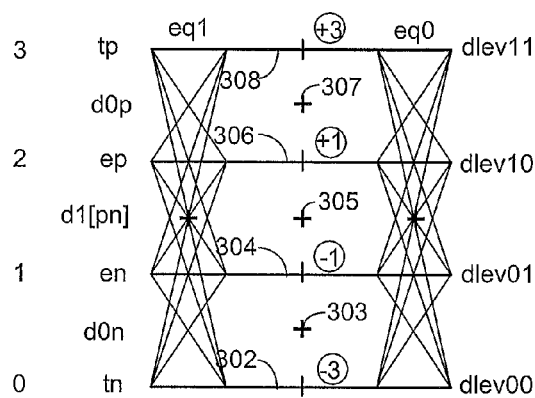

FIGS. 3A and 3B are schematic diagrams illustrating RSA sampler locations for a PAM 4 embodiment of the adaptive modal PAM2/PAM4 IQ phase detector of FIG. 2. The adaptive modal PAM2/PAM4 in-phase (I) quadrature (Q) (I/Q) phase detector for a receiver can detect phase error information by using either one of or a combination of both of in-phase edge detection and quadrature edge detection. In-phase edge detection uses the RSAs in the RSA element 240 and quadrature edge detection uses the RSAs 225 in the QES element 214.

The RSA 240 uses three data samplers, each with a different threshold level, to determine which of the four PAM 4 symbols to use to encode the RSA 240 output on connection 216 (FIG. 2). The data samplers associated with points 303, 305 and 307 are associated with standard data levels, which are illustrated as voltage amplitude levels 302 (level 0), 304 (level 1), 306 (level 2) and 308 (level 3), and which represent the ideal voltages that the summing node (connection 280) should have to represent each symbol. In a PAM 4 embodiment, the sampler associated with point 303 provides an output "d0n;" the sampler associated with point 305 provides an output "d1[pn]; and the sampler associated with point 307 provides an output "d0p." In a PAM 4 embodiment, the level 0 corresponds to a data level "tn" and to a data level "dlev00;" the level 1 corresponds to a data level "en" and to a data level "dlev01," the level 2 corresponds to a data level "ep" and to a data level "dlev10; and the level 3 corresponds to a data level "tp" and to a data level "dlev11." For example, if the input voltage is less than the voltage associated with the sampler at point 305, but more than the voltage associated with the sampler at point 303, then the RSA 240 will choose PAM 4 symbol 01 (associated with voltage level 304). Threshold levels at points 303, 305 and 307 are used by the RSA's in order to detect the standard data levels 302 (0), 304 (1), 306 (2) and 308 (3). However, the RSA 240 and QES 214 also contain samplers that can be used to generate edge information. Conceptually, the terms "eq1" and "eq0" denote quadrature edge samplers located in the QES element 214 and configured to sample the signal on connection 204 one-half UI before and after the locations at which the data samplers at points 303, 305 and 307 sample the data at the summing node 280; however, the actual time delta is likely to be on the order of 4.5 UI. The eq1 and eq0 samplers in the QES element 214 sample at the CTLE output on connection 204. But, the samplers at points 303, 305, 307 are sampling the summing node 280, after the FFE 220 has waited sufficient time to sample postcursors 1, 2, 3, and the DFE 230 adds it's contribution. When the in-phase and quadrature edge data signals are synchronized FFE/DFE delay for the in-phase edge data is eliminated, resulting in the two sampling points being separated by 0.5 UI.

Using the same hardware, and only changing registers in 256, the design can relax from receiving PAM 4 data at a given data rate, to receiving PAM 2 data at half that data rate.

Figure 4:
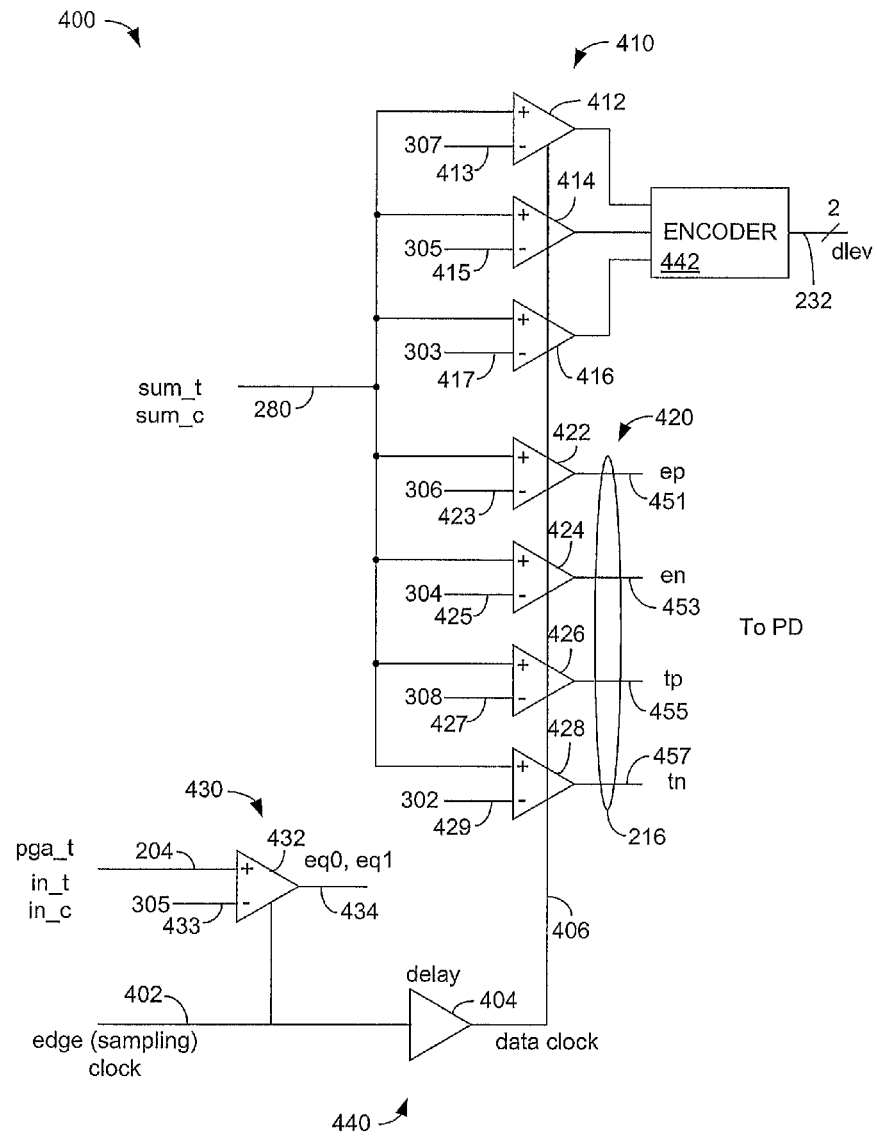
FIG. 4 is a block diagram showing an example of the sampler logic referred to in FIGS. 3A and 3B.

FIG. 4 is a block diagram 400 showing an example of the sampler logic referred to in FIGS. 3A and 3B used to detect the amplitude of a received signal. FIG. 4 illustrates examples of the data sampler logic 410, in-phase edge detection sampler logic 420 and quadrature edge detection sampler logic 430. A clock logic 440 comprises, in an embodiment, a delay element 404.

In a PAM 4 embodiment as shown in FIG. 4, the data sampler logic 410 comprises comparators 412, 414 and 416. In an embodiment, a non-inverting input of the comparators 412, 414 and 416 receive as input the sum_t and sum_c signals on the summing node 280 (FIG. 2). The comparator 412 receives an output of DAC_RSA 274, which is set to threshold level 307, on connection 413. The comparator 414 receives an output of DAC_RSA 274, which is set to threshold level 305, on connection 415, and the comparator 416 receives an output of DAC_RSA 274, which is set to threshold level 303, on connection 417. The threshold levels at points 303 and 307 are the same magnitude, but opposite polarity. In an embodiment, the same DAC is shared for these two levels, but the threshold inputs to one of the samplers are reversed to save area and power. The indexes in the name of the DACs in FIG. 2 denote the number of DACs, so DAC_RSA[3:0], indicates that there are four DACs, and DAC_RSA[0] is used to drive threshold 413, DAC_RSA[1] is used to drive threshold 415, etc.

In an embodiment, the in-phase edge detection sampler logic 420 comprises comparators 422, 424, 426 and 428. In an embodiment, a non-inverting input of the comparators 422, 424, 426 and 428 receive as input the sum_t and sum_c signals on the summing node 280 (FIG. 2). The comparator 422 receives an output of DAC_RSA 274, set to threshold level 306, on connection 423, the comparator 424 receives an output of DAC_RSA 274, set to threshold level 304, on connection 425, the comparator 426 receives an output of DAC_RSA 274, set to threshold level 308, on connection 427, and the comparator 428 receives an output of DAC_RSA 274, set to threshold level 302, on connection 429.

The quadrature edge detection sampler logic 430 comprises a comparator 432, which receives at a non-inverting input the output of the CTLE 202 over connection 204, and which receives an output of DAC_QES 276, set to threshold level 305, on connection 433.

An edge clock signal is provided to the delay element 404 and to the comparator 432 over connection 402. A data clock signal is generated over connection 406 and is provided to the comparators of the data sampler logic 410 and the in-phase edge detection logic 420. The clock on connection 402 can also be referred to as a "sampling" clock for one of the eight pipelined stages 212. Each pipeline stage would have this sampling clock shifted by one UI of phase from a neighboring stage.

Outputs of the comparators 412, 414 and 416 are provided to an encoder 442. The encoder 442 provides the "dlev" signal over connection 232 (and 216). In this PAM 4 example, the signal on connection 232 comprises a 2 bit PAM 4 code word, and the possible "dlev" outputs are "dlev00", "dlev01", "dlev10" and "dlev11."

Outputs of the comparators 422, 424, 426 and 428 are provided over connection 216. In an embodiment, the output of the comparator 422 on connection 451 comprises the "ep" signal, the output of the comparator 424 on connection 453 comprises the "en" signal, the output of the comparator 426 on connection 455 comprises the "tp" signal, and the output of the comparator 428 on connection 457 comprises the "tn" signal.

As stated above, the signal "dlev" is a digital symbol, representing four possible voltage levels (302, 304, 306, 308), and refers to data only (ignoring any edge or phase info). If the clock element 224 (FIG. 2) has perfectly aligned the data and clock of the receiver, then the edge samplers would be observing these levels exactly. However, if clock and data are not perfectly aligned then the edge samplers observe different voltages, and the generated error is used to drive the clock element 224 back into alignment with the data.

The output of the comparator 432 on connection 434 comprises the quadrature edge data signals "eq0" and "eq1."

Figure 5A:
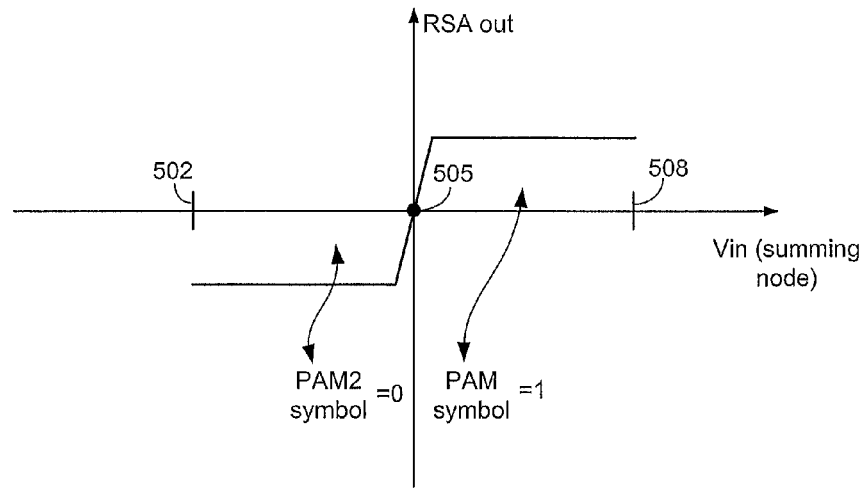
FIGS. 5A and 5B are schematic diagrams illustrating RSA sampler locations for a PAM 2 embodiment of the adaptive modal PAM2/PAM4 IQ phase detector of FIG. 2.
Figure 5B:
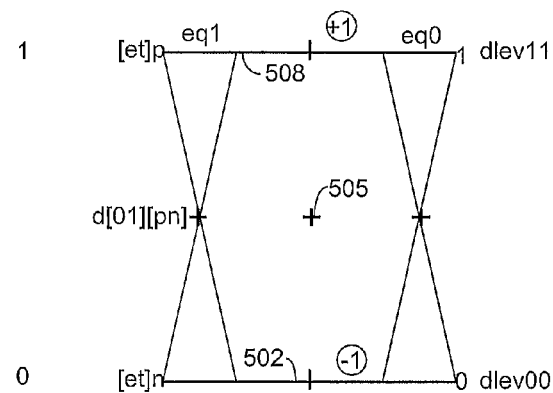

FIGS. 5A and 5B are schematic diagrams illustrating RSA sampler locations for a PAM 2 embodiment of the adaptive modal PAM2/PAM4 IQ phase detector of FIG. 2.

The RSA 240 uses one data sampler at point 505 to determine which of the two PAM 2 symbols to use to encode the RSA 240 output. The threshold level corresponds to the data sampler at point 505. For example, if the input voltage is less than the voltage associated with the sampler at point 505, then the RSA 240 will choose PAM 2 symbol 0 (voltage level 502).

Figure 6:
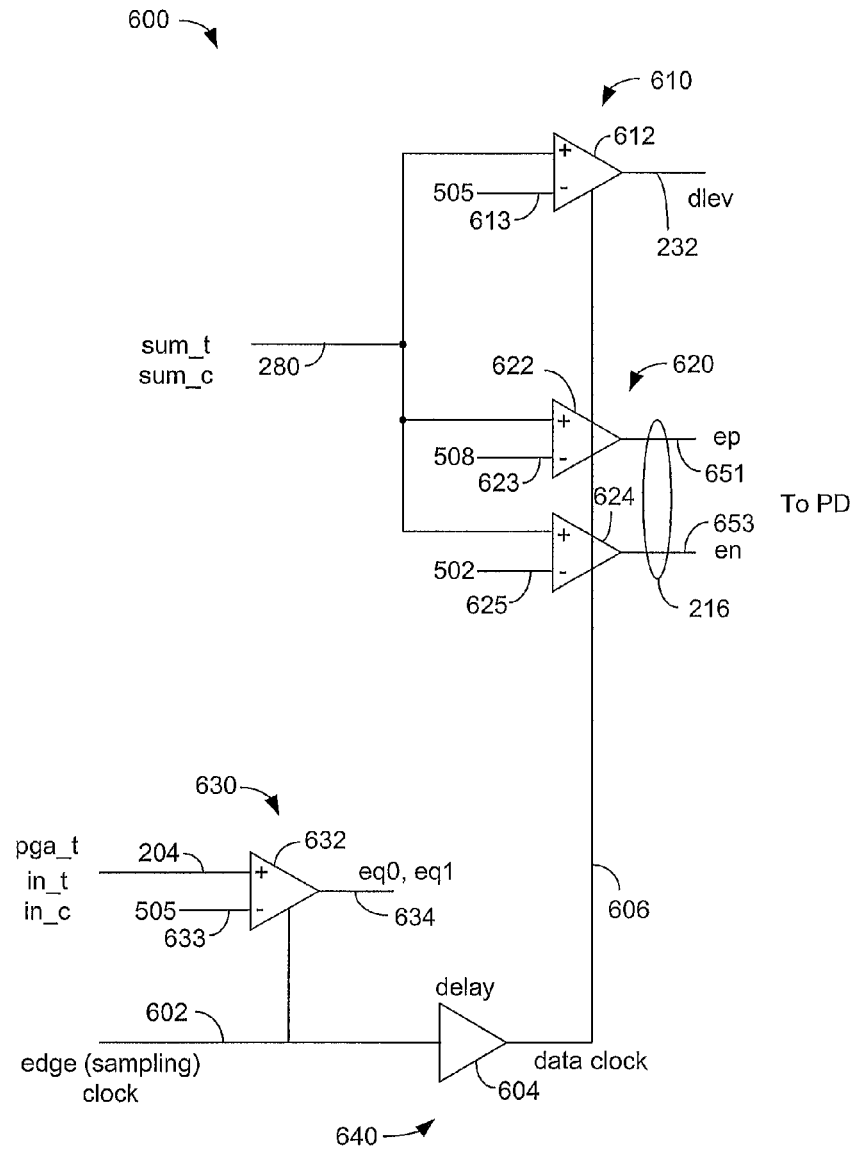
FIG. 6 is a block diagram showing an example of the sampler logic referred to in FIGS. 5A and 5B.

FIG. 6 is a block diagram 600 showing an example of the sampler logic referred to in FIGS. 5A and 5B used to detect the amplitude of a received signal. FIG. 6 illustrates examples of the data sampler logic 610, in-phase edge detection sampler logic 620 and quadrature edge detection sampler logic 630. A clock logic 640 comprises, in an embodiment, a delay element 604.

In a PAM 2 embodiment as shown in FIG. 6, the data sampler logic 610 comprises a comparator 612. In an embodiment, a non-inverting input of the comparator 612 receives as input the sum_t and sum_c signals on the summing node 280 (FIG. 2). The comparator 612 receives an output of the sampler 505 on connection 613.

In an embodiment, the in-phase edge detection sampler logic 620 comprises comparators 622 and 624. In an embodiment, a non-inverting input of the comparators 622 and 624 receive as input the sum_t and sum_c signals on the summing node 280 (FIG. 2). The comparator 622 receives an output of DAC_RSA 274, set to threshold 508, on connection 623, and the comparator 624 receives an output of DAC_RSA 274, set to threshold 502, on connection 625.

The quadrature edge detection sampler logic 630 comprises a comparator 632, which receives at a non-inverting input the output of the CTLE 202 over connection 204, and which receives an output of DAC_QES 276, set to threshold 505, on connection 633.

An edge sampling clock signal is provided to the delay element 604 and to the comparator 632 over connection 602. A data clock signal is generated over connection 606 and is provided to the comparators of the data sampler logic 610 and the in-phase edge detection logic 620.

The output of the comparator 612 is provided on connection 232 and comprises a 1 bit PAM 2 code word, and the possible "dlev" outputs are "dlev00" and "dlev11."

Outputs of the comparators 622 and 624 are provided over connection 216. In an embodiment, the output of the comparator 622 on connection 651 comprises the "ep" signal, and the output of the comparator 624 on connection 653 comprises the "en" signal.

The output of the comparator 632 on connection 634 comprises the quadrature edge data signals "eq0" and "eq1."

To switch between processing modulation associated with PAM4 and PAM2, the voltage threshold of the samplers associated with the data levels 304 and 306 (FIGS. 3 and 4) are changed to be the same values as the voltage thresholds of the samplers associated with the data levels 502 and 508 (FIGS. 5 and 6), while setting the voltage threshold of the samplers associated with the data levels 302 and 308 (FIGS. 3 and 4) to unachievable values so their inputs are constant. In this manner, the receiver 200 can be switched between processing a PAM4 modulation modality and a PAM2 modulation modality.

Figure 7A:
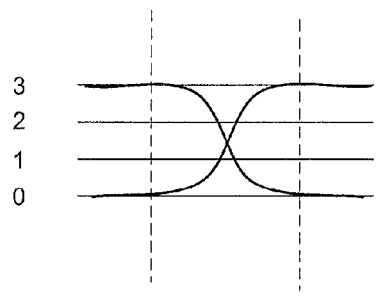
FIGS. 7A through 7F illustrate examples of PAM 2/PAM 4 edge qualifications.
Figure 7B:
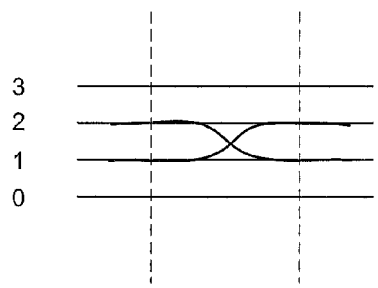
Figure 7C:
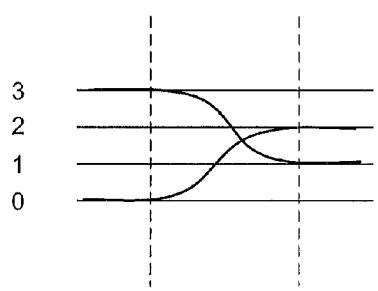
Figure 7D:
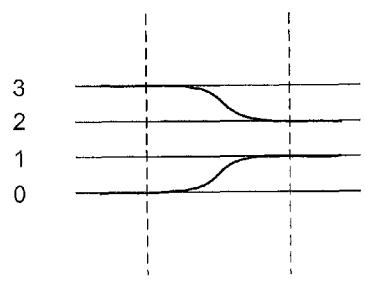
Figure 7E:
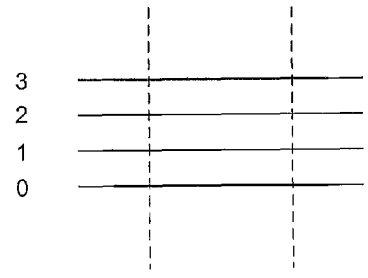
Figure 7F:
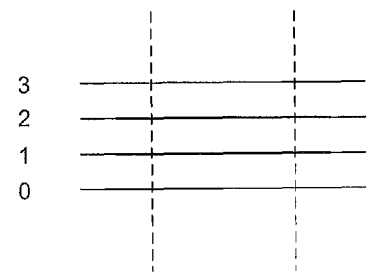

FIGS. 7A through 7F illustrate examples of PAM 2/PAM 4 edge qualifications for both quadrature and in-phase signal transitions. FIG. 7A shows 3-0 and 0-3 symmetric transitions; FIG. 7B shows 2-1 and 1-2 symmetric transitions; FIG. 7C shows 3-1, 1-3, 0-2 and 2-0 asymmetric transitions. FIG. 7D shows 3-2, 2-3, 0-1 and 1-0 symmetric transitions with no edge detected; FIG. 7E shows 3-3 and 0-0 transitions with no edge detected; and FIG. 7F shows 2-2 and 1-1 transitions with no edge detected.

Figure 8A:
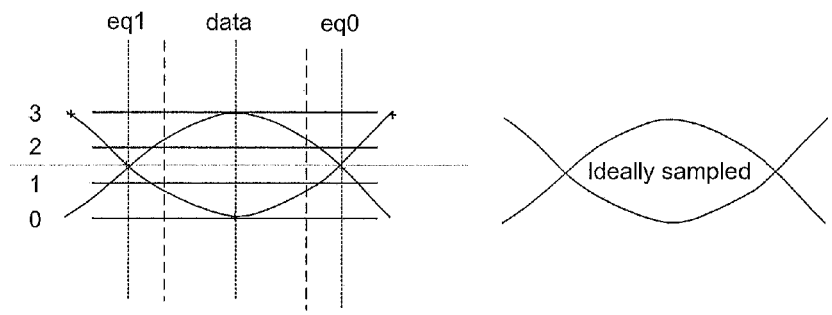
FIG. 8A shows a PAM 2/PAM 4 quadrature edge up/down classifications for an ideally sampled waveform.
Figure 8B:
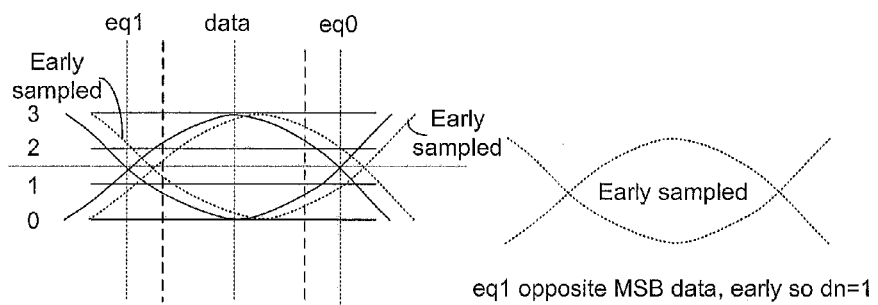
FIG. 8B shows a PAM2/PAM4 quadrature edge up/down classifications for an early sampled waveform.
Figure 8C:
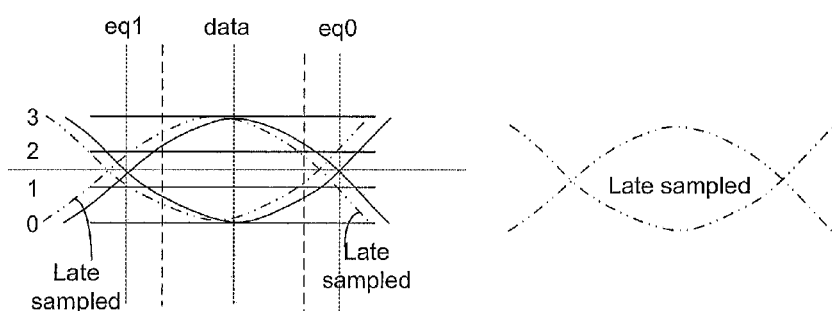
FIG. 8C shows a PAM2/PAM4 quadrature edge up/down classifications for a late sampled waveform.
Figure 9A:
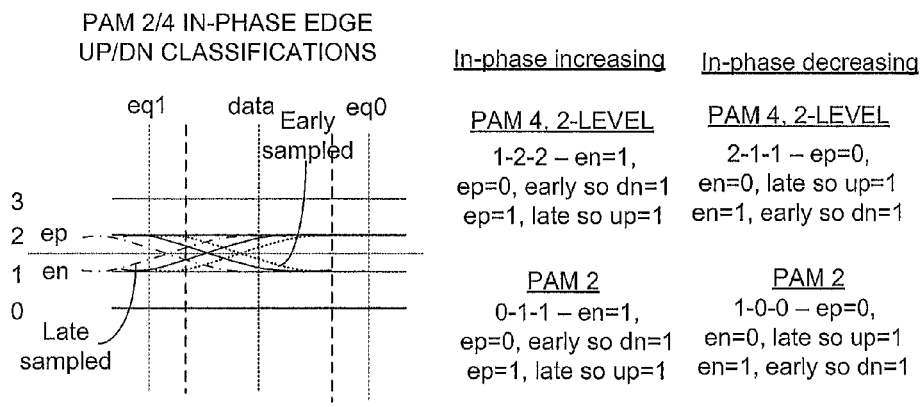
FIGS. 9A through 9D show PAM 2/PAM 4 in-phase edge up/down classifications for ideally sampled, early sampled and late sampled waveforms for PAM 4, 2-level and PAM 2 signals.
Figure 9B:
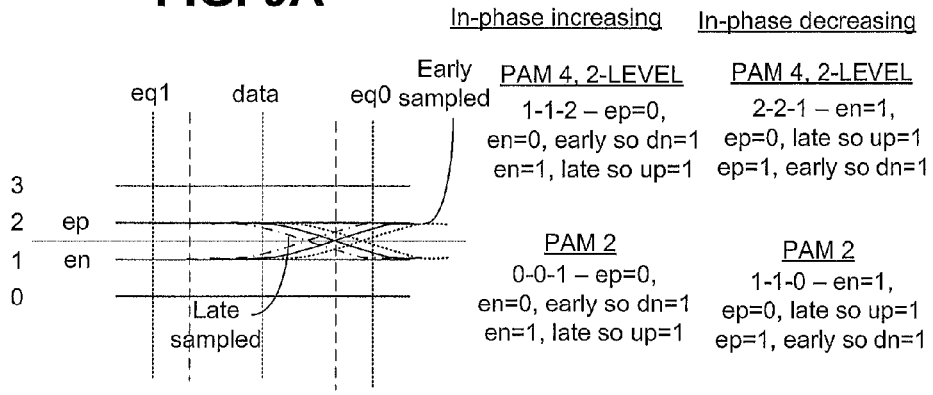
Figure 9C:
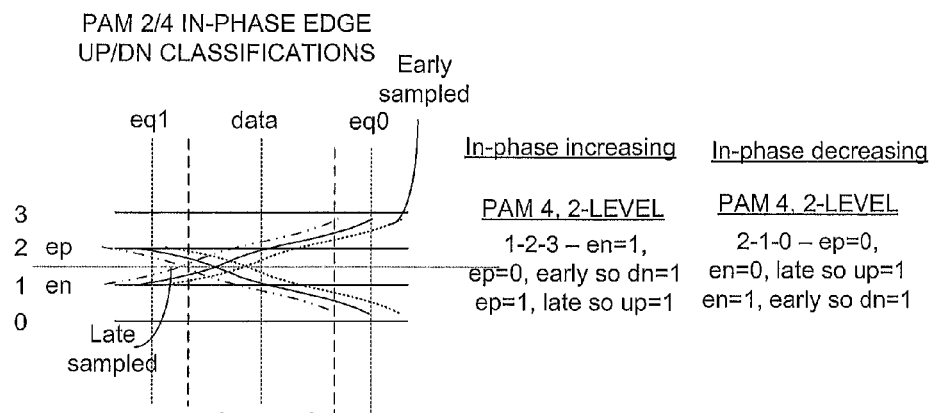
Figure 9D:
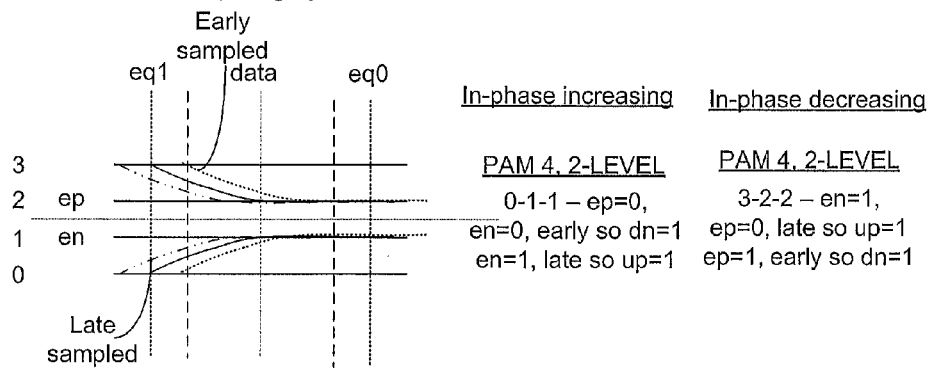

FIG. 8A shows a PAM 2/PAM 4 quadrature edge up/down classifications for an ideally sampled waveform. FIG. 8B shows a PAM2/PAM4 quadrature edge up/down classifications for an early sampled waveform. FIG. 8C shows a PAM2/PAM4 quadrature edge up/down classifications for a late sampled waveform.

FIGS. 9A through 9D show PAM 2/PAM 4 in-phase edge up/down classifications for ideally sampled, early sampled and late sampled waveforms for PAM 4, 2-level and PAM 2 signals.

Figure 10A:
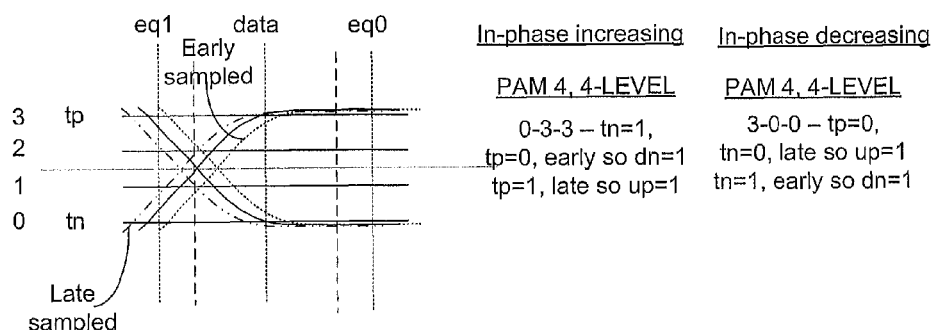
FIGS. 10A and 10B show PAM 4 in-phase edge up/down classifications for ideally sampled, early sampled and late sampled waveforms for PAM 4, 4-level signals.
Figure 10B:
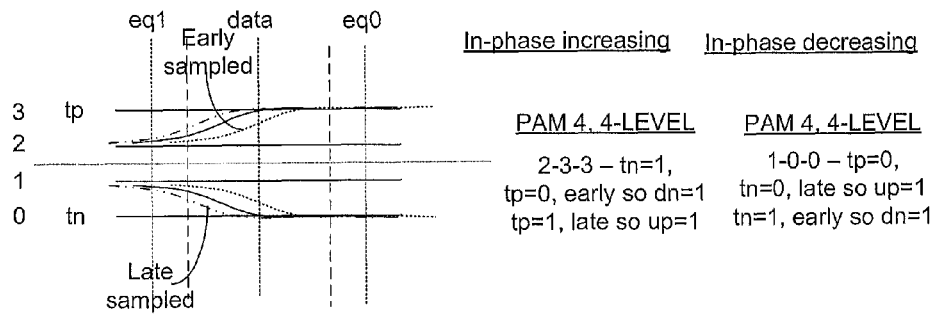

FIGS. 10A and 10B show PAM 4 in-phase edge up/down classifications for ideally sampled, early sampled and late sampled waveforms for PAM 4, 4-level signals.

Figure 11:
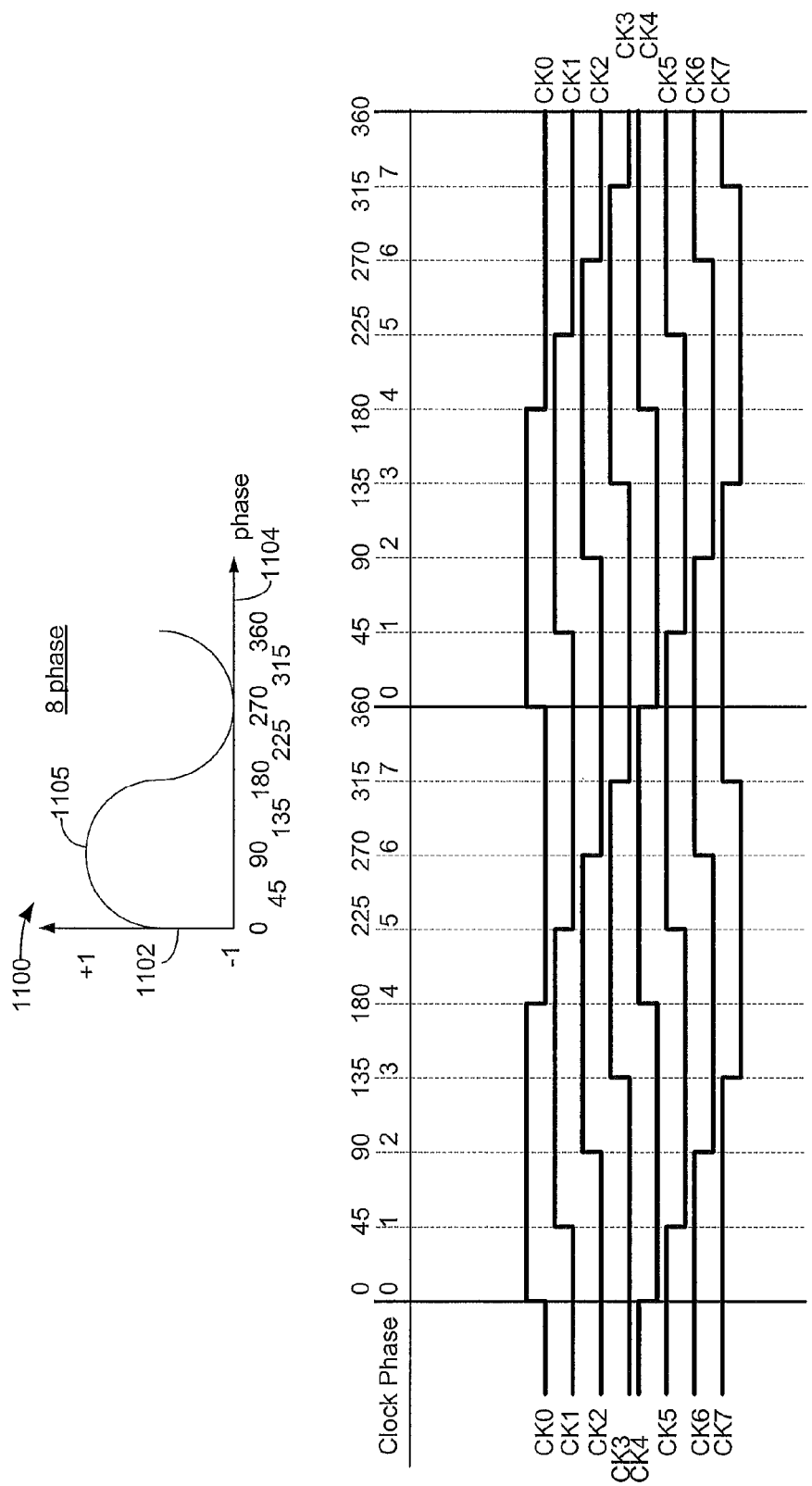
FIG. 11 is a graphical diagram of an 8 phase clock signal supplied to the RSA 240 of FIG. 2.

FIG. 11 is a graphical diagram of an 8 phase clock signal supplied to the RSA 240 of FIG. 2. A graphical example of the input signal provided to the RSA 240 is shown in the graph 1100. The vertical axis 1102 of the graph 1100 refers to relative amplitude in volts (V), with a normalized value range of between −1V and +1V. The horizontal axis 1104 refers to the phase of the clock signal. The clock signal is sampled at 45 degree intervals to generate the 8 clock phases in one clock cycle represented by the trace 1105. The 8 clock phases are also shown as signal traces CK0 through CK7. The repeating periods "0" through "7" refer to system clock intervals, and the time between each repeating period is referred to as a 'UI' or unit interval of the system clock.

The adaptive modal PAM 2/PAM 4 in-phase (I) quadrature (Q) phase detector for a receiver can detect phase error by using quadrature edge detection, in-phase edge detection, or by a combination of quadrature edge detection and in-phase edge detection. Different channels and conditions would tend to favor one of these methods over the other, so it is valuable to have the ability to choose between them in real time, particularly when implemented in a high volume receiver.

Figure 14:
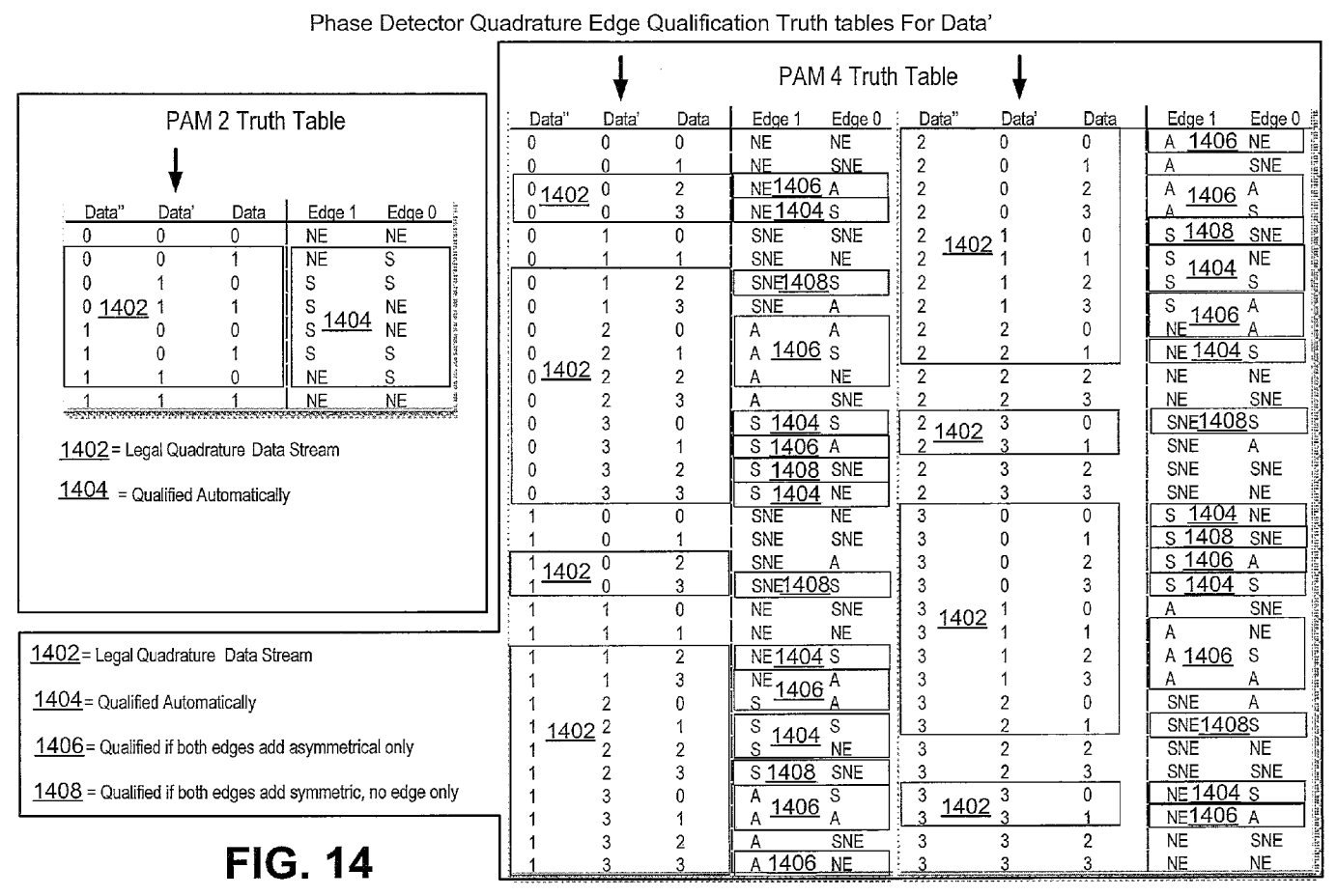

Phase error detection using quadrature edge detection is intuitive. The set of RSA's 225 in the QES element 214 is used to sample the data channel on connection 204 at the time when a symbol is transitioning. When the channel voltage is transitioning from one symbol to an adjacent symbol, the channel voltage should ideally pass through point 305 (FIGS. 3A and 3B). Therefore, by setting the QES RSA's 225 to this level, and clocking them at that expected transition time (nominally one half UI offset from data samplers, as described above), quadrature edge error information "eq0" and "eq1" can be generated. For example, if a QES RSA 225 has the threshold denoted by level 305, and it detects the channel to be positive at the eq1 position, then this could indicate that the data edge is arriving late (if qualified by the situation of data going from dlev11 to dlev00 to dlev11, where the MSB data is 0, inside a 3-0-3 pattern. In this case, since a positive is detected, which is opposite of MSB data, it indicates that the data was early sampled, and that the clock element 224 (FIG. 2) should be updated with a down signal (dn=1). Because the waveform shape can vary greatly for the transition between the various PAM4 codes, qualification is used to ensure that phase error information is only updated under circumstances that would allow a high quality edge, e.g., a 0-3-0 transition, as shown in FIG. 8A for an ideally sampled waveform, FIG. 8B for an early sampled waveform, and FIG. 8C for a late sampled waveform. In an embodiment, there are edge quality mode settings. These allow more, lower quality edges to be qualified or fewer higher quality edge qualifications depending on the setting. FIG. 14 summarizes the quadrature edge qualifications. In FIGS. 14, 15, 16A and 16B, "S" denotes "symmetric," "A" denotes "asymmetric," "NE" denotes "no edge," and "SNE" denotes "symmetric no edge."

Phase error detection using in-phase edge detection uses extra RSA's in the RSA element 240 (logic 420 in FIG. 4) but they are clocked at the same time as the standard data RSA's are (as shown in FIG. 4), obviating the need to generate a separate clock bus having an accurate/adjustable phase offset from the data clock bus. The description of in-phase edge detection classifications is shown in FIGS. 9A through 9D, and in FIGS. 10A and 10B.

Figure 15:
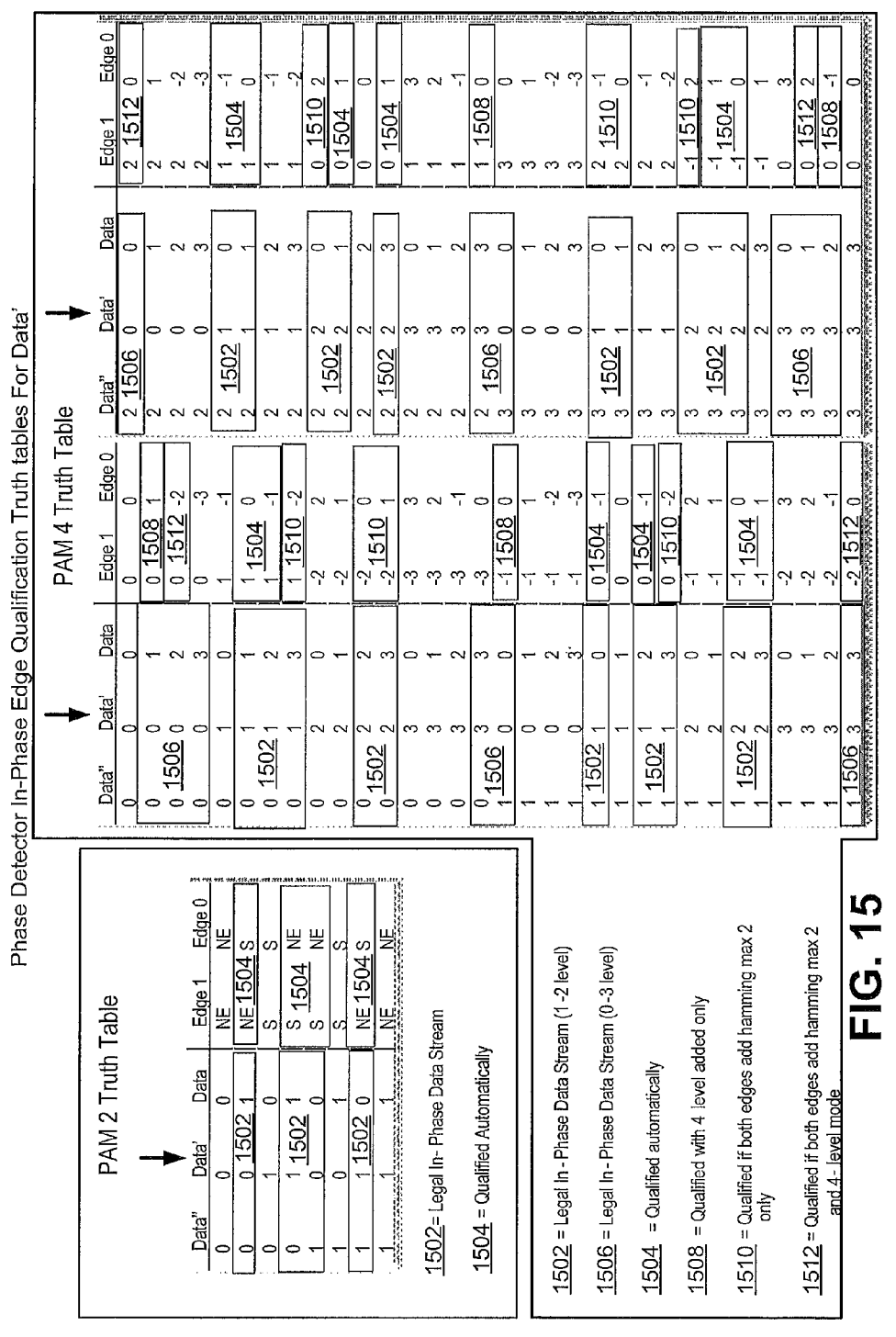

Referring again to FIGS. 3A and 3B, in-phase detection operates by setting RSA thresholds at the expected voltage levels of the data, 302, 304, 306 and 308. This generates error information by inferring that if the data is coming from a known direction, and is lower or higher than the nominal voltage for that symbol, it is either late or early. For example, in a data sequence of 1-2-3, the RSA with a threshold set at level 306 is analyzed, when the "2" symbol is expected to be sampled. If the RSA output is high, indicating the data channel voltage is above the threshold, it can be inferred that the edge has arrived early, and the clock system should be updated to increase the sampling clock frequency. This decision at the "2" in this example symbol can only be made by employing the qualification of the 3 and 1 that precede and follow it. FIG. 15 summarizes the in-phase edge qualifications, and shows how some can be added if conditions warrant, using the various mode settings.

Figure 12:
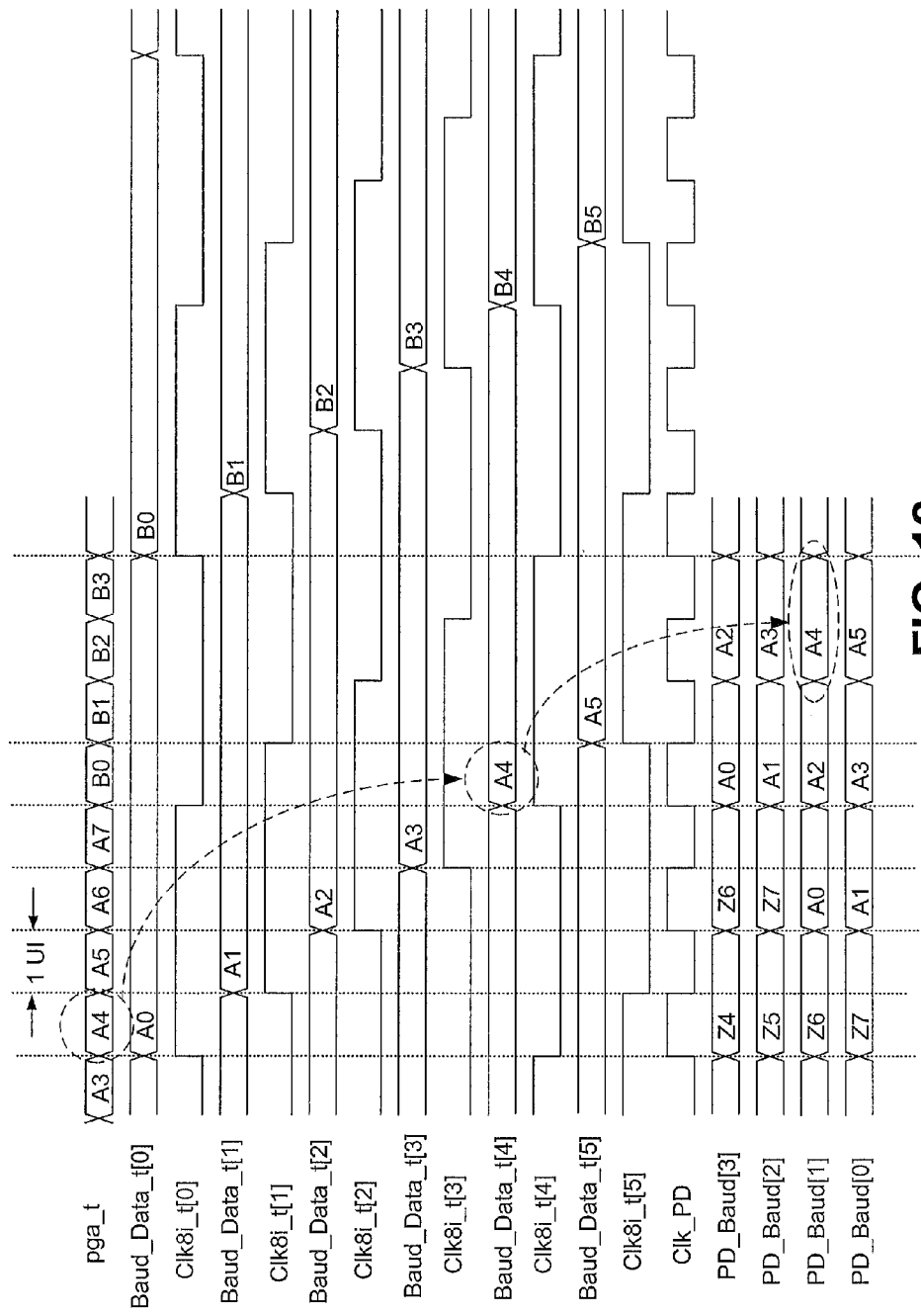
FIG. 12 is a timing diagram showing the timing of the RSA and phase detector of FIG. 2.

FIG. 12 is a timing diagram showing the timing of the RSA and phase detector of FIG. 2. The nomenclature "A" and "B" represent sequences of data that are 8 baud in length. Each baud contained in one of these sequences has a subscript to show where it occurs in the sequence, from 0 to 7. The data in the channel is not expected to follow a pattern of 8 bauds, and this is only done to illustrate how each baud is sampled, then handed from block to block in this section of the design. The vertical lines shown in FIG. 12 denote system clock UIs with a 1 UI period shown for reference.

FIG. 12 shows how the phase detector 218 (FIG. 2) gathers the outputs from each section of the pipelined portion of the receiver for generation of the up/down signal on connection 222. Not all eight sections of the pipeline are shown in FIG. 12, but the pattern apparent in FIG. 12 would continue across all eight sections. The first waveform in FIG. 12 shows the pga_t signal, which is the output of the CTLE 202 and referred to as in_t/in_c, 204 in FIG. 2. The label "A4" in the pga_t waveform indicates that at that time, section 4 of the pipeline is sampling pga_t as its main cursor data. Each section of the pipeline uses some time to process the input samples (for the FFE 220 to sample other cursors, for the DFE 230 to add its contribution, for the RSA 240 to generate its decision). This is shown in FIG. 12 by noting that the "Baud_Data_t[4]" result for "A4" is valid 3 UI after A4 was present at the input to the pipeline. The phase detector 218 clocks the A4 result in, after an additional 2 UI, where it takes the local name "PD_Baud[1]", one of the six baud data values that the phase detector 218 will process, with only four shown in FIG. 12 for simplicity of illustration. This function is performed by the "Baud Data Mux/Reg" block in FIG. 13, element 1315, and the "PD_Baud[1]" is one of the six baud data values in the signal on connection 1318 (FIG. 13).

Figure 13:
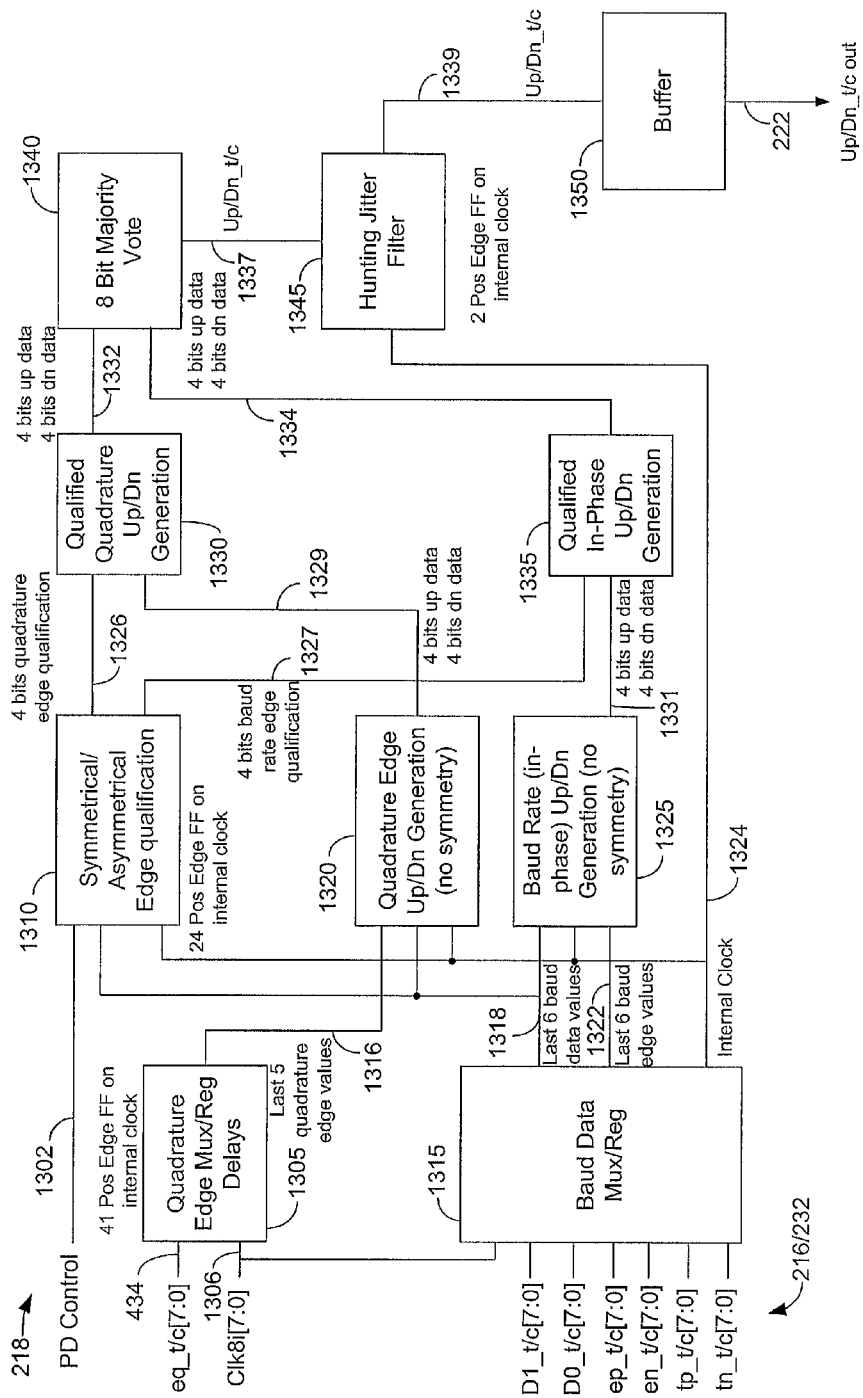
FIG. 13 is a block diagram of the phase detector of FIG. 2.

FIG. 13 is a functional block diagram illustrating the operation of the phase detector 218 of FIG. 2. The phase detector 218 comprises a quadrature edge multiplexer and register delay element 1305, a symmetrical/asymmetrical edge qualification element 1310, a baud data multiplexer/register element 1315, a quadrature edge up/down generation element 1320, a baud rate up/down generation element 1325, a qualified quadrature up/down generation element 1330 (also referred to as a quadrature qualification element), a qualified in-phase up/down generation element 1335 (also referred to as an in-phase qualification element), an 8 bit majority vote element 1340, a hunting jitter filter 1345 and a buffer 1350.

The six, eight-bit buses (216/232) provide an input to the baud data multiplexer/register element 1315. These signals represent the in-phase data and edge information from the RSAs of the eight receiver pipeline sections, 240 in FIG. 2. They are samples from the maximum opening of the data channel eye, and represent the following signals from connections 216 and 232 (FIG. 2): D0_t/c[7:0] is the LSB of dlev, in FIG. 3B; D1_t/c[7:0] is the MSB; and ep_t, en_t, tp_t, tn_t are the in-phase edge data.

The eq_t/c[7:0] signals are the quadrature edge values from the QES element 214 in FIG. 2 and FIG. 4, and are provided over connection 434 (FIG. 4). These are samples from the edge of the data channel eye. Note that since the quadrature edge values are sampled directly from the CTLE output on connection 204, while the in-phase values which are sampled and processed with more delay through the FFE and DFE, the quadrature edge values are put through extra register delays in block 1305, to synchronize the in-phase and the quadrature data.

In-phase edge error generation is generated in block 1325 resulting in 4 bit up and 4 bit down data on connection 1331. This data is then qualified in block 1335, based on valid in-phase data sequences, and based on which in-phase modes are selected. The up/down generation is based on FIGS. 9A through 9D, and additionally FIGS. 10A and 10B if PAM4 4-level detection mode is enabled, and the logic derived from the truth tables in FIGS. 18A and 18B. Up/down signal qualification is based on the truth table in FIG. 15.

Similarly, quadrature edge detection is generated in block 1320, and then qualified in block 1330. The qualification is based on valid quadrature data sequences and the quadrature mode selected. Quadrature edge data is based on FIGS. 8A, 8B and 8C, and the logic derived from the truth tables in FIGS. 17A and 17B. The up/down signal qualification is based on the truth table in FIG. 14.

The two sets of qualified, 4-bit up/down data are next sent to the 8 bit majority vote element 1340 over connections 1332 and 1334. The qualified quadrature 4-bit up/down data are provided over connection 1332 and the qualified in-phase 4-bit up/down data is provided over connection 1334. Depending on which modes are enabled via the register block 256, the up/down error signal provided by the 8 bit majority vote element 1340 on connection 1337 will be based on only quadrature edge detection, only in-phase edge detection, or on a combination of both in-phase edge detection and quadrature edge detection. The ability to use either in-phase edge detection or quadrature edge detection, or a combination of both of in-phase edge detection and quadrature edge detection is useful in situations where channel loss is a major factor in communication systems, but is outside the control of the receiver design. Current receiver designs are generally intended to cover a large range of communication channels with large variances in channel loss. If channel loss is high, the time from receiving the signal to generation of in_t and in_c from the CTLE (202 on FIG. 2) becomes highly variable. In addition, because the magnitude of the input signal is small, the CTLE 202 cannot drive in_t and in_c to the maximum voltage of the receiver. Both of these problems are particularly difficult for quadrature detection to overcome. So, in the case of high loss channels the phase detector is generally configured to only in-phase detection. However, the same transmitter and receiver design can be used on a channel with low channel loss. In the case of low channel loss, the signal entering the CTLE 202 is large, so the CTLE 202 drives very predictable large swing signals on in_t and in_c (connection 204, FIG. 2). In this case, in-phase detection cannot be used to reliably determine whether the signal is early or late because the signal at the RSA 240 is at the maximum value for most of a UI. In this situation, in-phase detection sets the center of the eye close to the edge, which is the opposite of what is desired. Therefore, in low loss channels, the phase detector is generally configured to quadrature-only edge detection. These two extremes justify separate phase detection schemes to address both situations. However, channels with loss profiles in between the extremes will also benefit from a combination of in-phase and quadrature edge detection, which is provided by the 8-bit majority vote element 1340. The 8-bit majority vote element 1340 mixes the multiple up/down signals coming from the qualification blocks, 1330 and 1335 and determines a single up/down signal to be sent to the hunting jitter filter 1345.

Figure 19:
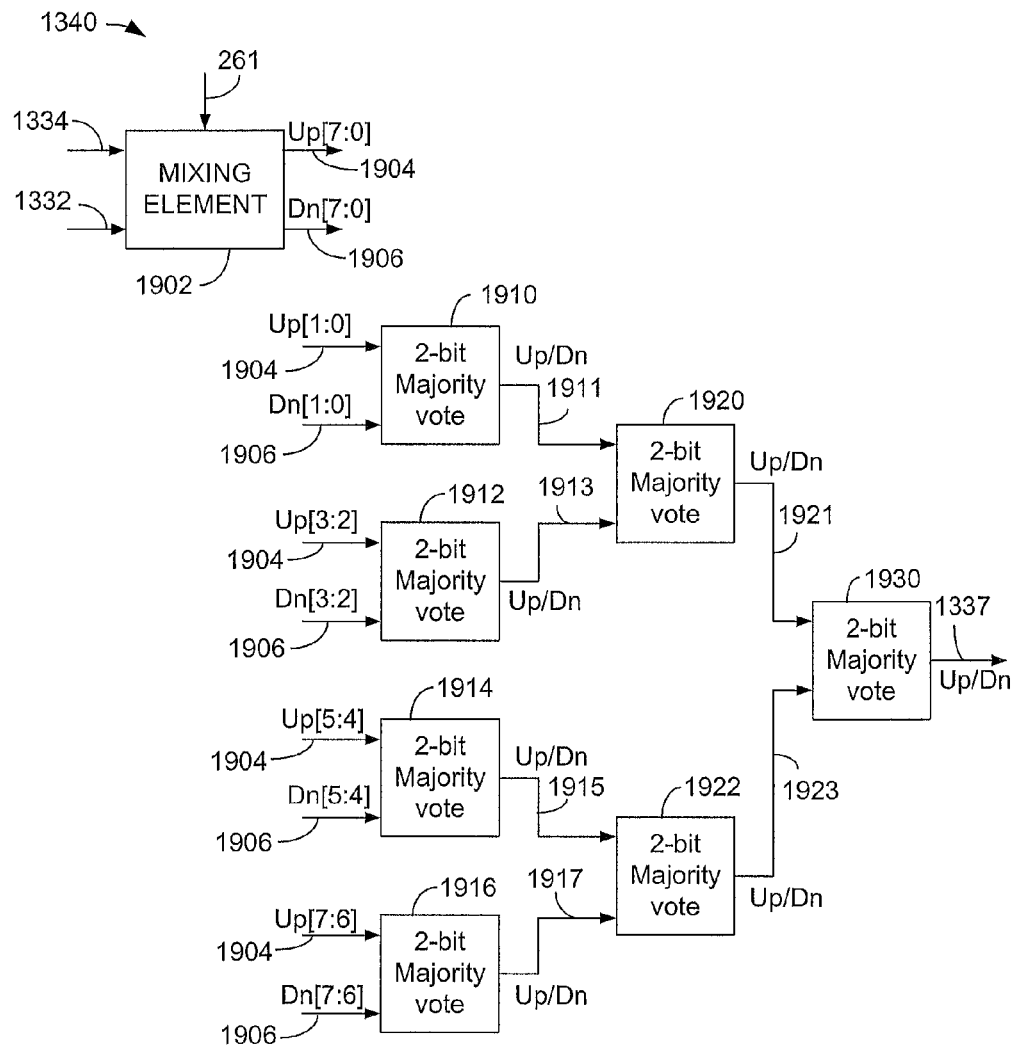
FIG. 19 is a block diagram of the majority vote element in the phase detector of FIG. 13.

FIG. 19 is a block diagram of the 8-bit majority vote element 1340 of FIG. 13. In an embodiment, the 8-bit majority vote element 1340 comprises a mixing element 1902 and a plurality of 2-bit majority vote elements. The mixing element 1902 receives as input the qualified quadrature 4-bit up/down data over connection 1332 and the qualified in-phase 4-bit up/down data over connection 1334. A control signal is provided over connection 261 from the registers 256 (FIG. 2). The mixing element 1902 comprises logic for implementing eight ignoring functions (illustrated by the nomenclature "Up [7:0]" and "Dn[7:0]". Any pair of Up/Dn inputs from the qualification blocks 1330 and 1335 can be ignored. For example, 0, 1, 2, 3, or all 4 inputs from the quadrature qualification block 1330 can be ignored, and 0, 1, 2, 3, or all 4 inputs from the in-phase qualification block 1335 can be ignored. The mixing element 1902 selectively ignores the inputs based on instruction from the registers 256 via the CPU 252 and connection 261 and can change any up or down command coming from the qualification blocks 1330 and 1335 to a "no operation" command. In this manner, the in-phase and quadrature phase detection can be selectively weighted to mix them together before majority voting.

In an embodiment, the weighting can be based on channel loss information obtained by, for example, observing a performance metric such as vertical eye opening at a specific bit error rate (BER), and by selectively mixing the in-phase edge and quadrature edge information until an optimal value is observed.

An alternative approach for determining the weighting can include measuring the effects of channel loss on the jitter in the clock circuit of the receiver 200. The jitter in the clock circuit is related to channel loss because as the channel loss increases, the delay time of the CTLE 202 becomes less predictable and so relying solely on quadrature edge detection might increase the jitter in the clock of the receiver. This jitter directly subtracts from the reliability of receiving the communicated signal by shrinking the eye width. In this manner, random jitter (RJ), data dependent jitter (DDJ), total jitter (TJ), or other jitter measurements can be taken and used to determine the amount of in-phase edge detection to add to the phase detector. During the monitoring of the jitter measurements, a graph of the jitter measurements vs amount of in-phase detection can be created to determine the optimal mixing of quadrature and in-phase edge detection to be done in the phase detector to maximize communications reliability.

In an embodiment, the 8-bit majority vote element 1340 implements a simple "majority vote" structure in which 8 bits are received and processed. However, other bit lengths and other ways of mixing signals are possible. As mentioned above, the quadrature qualification element 1330 and the in-phase qualification element 1335 send eight signals each, four up signals and four down signals to the 8-bit majority vote element 1340. The four up signals and four down signals from the quadrature qualification element 1330 correspond with a clock command associated with each of the four edges currently being processed by the phase detector 218. In addition the four up signals and four down signals from the in-phase qualification element 1335 correspond with a clock command associated with each of the four amplitudes currently being processed by the phase detector 218. As such, a single clock command, which comprises a single up and a single down signal can legally take three of the possible four binary combinations. The legal commands are up=1, dn=0, up=0, dn=1, and up=0, dn=0. As an example, up=1, dn=0 is a valid up command to the clock element 224 (FIG. 2). Besides valid up and down commands, up=0, dn=0 is a valid "no operation" command to the clock element 224 (FIG. 2). However, the final binary combination up=1, dn=1 is an illegal combination and would be switched to up=0, dn=0 in the qualification elements 1330 and 1335 before being passed to the majority vote element 1340.

Control signals provided by the registers 256 (FIG. 2) over connection 261 can be configured to control quadrature/in-phase edge information mixing, as mentioned above. If in-phase only phase detection is desired, the phase detector 218 can be set to ignore the data coming from the quadrature qualification element 1330. In this case, the mixing element 1902 changes all up/down signals from the quadrature qualification element 1330 to "no operations" before mixing begins. The opposite can be done if quadrature-only qualification is desired by changing all up/down signals from the in-phase qualification element 1335 to "no operations" before mixing begins. In addition to completely ignoring certain phase detection schemes, the phase detector 218 can be configured to ignore 1, 2, or 3 of the clock commands coming from either of the quadrature qualification element 1330 and in-phase qualification element 1335. In this way, in-phase or quadrature phase detection can be weighted differently, based on how many commands are ignored from each qualification block 1330 and 1335. Once the weighting has been determined the qualified up, down, and no operation commands are passed to the majority vote logic.

The majority vote logic comprises a cascaded arrangement of four (4) 2-bit majority vote elements 1910, 1912, 1914 and 1916, two (2) majority vote elements 1920 and 1922, and one (1) majority vote element 1930. Each of the majority vote elements 1910, 1912, 1914 and 1916 considers two clock commands from the mixing element 1902 over connections 1904 and 1906, and produces a single clock command as shown in the truth table of FIG. 20. These four outputs on connections 1911, 1913, 1915 and 1917 are then provided to two (2) 2-bit majority vote elements 1920 and 1922 following the same truth table of FIG. 20. The two (2) 2-bit majority vote elements 1920 and 1922 provide two single clock command outputs on connections 1921 and 1923. These final two clock command outputs are provided to one (1) final 2-bit majority vote element 1930 following the logic of FIG. 20. The final 2-bit majority vote element 1930 outputs the final up/down output of the 8-bit majority vote element 1340 on connection 1337 to be sent to the hunting jitter filter 1345.

The up/down error signal is then sent from the hunting jitter filter 1345 to a buffer 1350 before being sent to the clock element 224 (FIG. 2) over connection 222.

This disclosure describes the invention in detail using illustrative embodiments. However, it is to be understood that the invention defined by the appended claims is not limited to the precise embodiments described.

What is claimed is:

1. A phase detector, comprising:
    data detection logic for detecting data in a communication signal;
    amplitude detection logic for processing modulation of a PAM2 and a PAM4 communication modality;
    in-phase edge detection logic for detecting in-phase edge information in the communication signal;
    quadrature edge detection logic for detecting quadrature edge information in the communication signal substantially simultaneously with the detection of the in-phase edge information; and
    mixing logic for determining a variable amount of in-phase edge information and quadrature edge information to be applied based on at least one channel parameter in the communication channel.

2. The phase detector of claim 1, wherein the data detection logic comprises data sampler logic configured to generate a digital data signal.

3. The phase detector of claim 2, wherein the in-phase edge detection logic comprises in-phase sampler logic configured to generate a digital in-phase edge signal.

4. The phase detector of claim 2, wherein the quadrature edge detection logic comprises quadrature sampler logic configured to generate a digital quadrature edge signal.

5. The phase detector of claim 2, wherein the mixing logic determines an amount of in-phase edge information and quadrature edge information to be applied based on channel loss.

6. The phase detector of claim 5, wherein the channel loss is determined by bit error rate.

7. The phase detector of claim 5, wherein the channel loss is determined by clock jitter.

8. The phase detector of claim 4, further comprising majority vote logic configured to apply the in-phase edge information and quadrature edge information provided by the mixing logic to develop a clock adjustment signal.

9. A method for processing a signal in a phase detector, comprising:
   detecting data in a communication signal;
   enabling amplitude detection of the communication signal regardless of whether the communication signal comprises a corresponding PAM2 or PAM4 communication modality;
   substantially simultaneously detecting in-phase edge information in the communication signal and quadrature edge information in the communication signal; and
   determining a variable amount of in-phase edge information and quadrature edge information to be applied to the communication signal based on at least one channel parameter in the communication channel.

10. The method of claim 9, wherein detecting data comprises using a data sampler logic configured to generate a digital data signal.

11. The method of claim 10, wherein detecting the in-phase edge information comprises using in-phase sampler logic configured to generate a digital in-phase edge signal.

12. The method of claim 10, wherein detecting the quadrature edge information comprises using quadrature sampler logic configured to generate a digital quadrature edge signal.

13. The method of claim 10, wherein the at least one channel parameter is channel loss.

14. The method of claim 13, wherein the channel loss is determined by analyzing bit error rate.

15. The method of claim 13, wherein the channel loss is determined by analyzing clock jitter.

16. The method of claim 12, further comprising applying the in-phase edge information and quadrature edge information to develop a clock adjustment signal.

17. A receiver system, comprising:
   a linear equalizer configured to provide a communication signal to a feed forward equalizer (FFE) and a decision feedback equalizer (DFE);
   data detection logic for detecting data in the communication signal;
   amplitude detection logic for processing modulation of a PAM2 and a PAM4 communication modality;
   in-phase edge detection logic for detecting in-phase edge information in the communication signal;
   quadrature edge detection logic for detecting quadrature edge information in the communication signal substantially simultaneous with the detection of the in-phase edge information; and
   mixing logic for determining a variable amount of in-phase edge information and quadrature edge information to be applied based on at least one channel parameter in the communication channel.

18. The receiver system of claim 17, wherein the data detection logic comprises data sampler logic configured to generate a digital data signal.

19. The receiver system of claim 18, wherein the in-phase edge detection logic comprises in-phase sampler logic configured to generate a digital in-phase edge signal.

20. The receiver system of claim 18, wherein the quadrature edge detection logic comprises quadrature sampler logic configured to generate a digital quadrature edge signal.

21. The receiver system of claim 18, wherein the mixing logic determines an amount of in-phase edge information and quadrature edge information to be applied based on channel loss.

22. The receiver system of claim 21, wherein the channel loss is determined by bit error rate.

23. The receiver system of claim 21, wherein the channel loss is determined by clock jitter.

24. The receiver system of claim 20, further comprising majority vote logic configured to apply the in-phase edge information and quadrature edge information provided by the mixing logic to develop a clock adjustment signal.

* * * * *